(12) United States Patent
McGuire et al.

(10) Patent No.: US 7,546,594 B2
(45) Date of Patent: Jun. 9, 2009

(54) SYSTEM AND METHOD FOR UPDATING INSTALLATION COMPONENTS USING AN INSTALLATION COMPONENT DELTA PATCH IN A NETWORKED ENVIRONMENT

(75) Inventors: Thomas D. McGuire, Georgetown, TX (US); Derek P. Menzies, Sammamish, WA (US); Michael V. Sliger, Sammamish, WA (US); Derek Cheng, Issaquah, WA (US); Mazhar Mohammed, Sammamish, WA (US); Manojkumar Shende, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 10/737,162

(22) Filed: Dec. 15, 2003

(65) Prior Publication Data
US 2005/0132359 A1 Jun. 16, 2005

(51) Int. Cl.
G06F 9/44 (2006.01)
G06F 9/45 (2006.01)
(52) U.S. Cl. ............... 717/168; 717/171; 717/172; 717/173; 717/174; 717/176; 717/177
(58) Field of Classification Search ............... 717/122, 717/168, 178, 177, 176, 173, 171, 169; 705/1
See application file for complete search history.

(56) References Cited
U.S. PATENT DOCUMENTS

| | | | |
|---|---|---|---|
| 5,481,722 A * | 1/1996 | Skinner ............... 717/122 |
| 5,491,820 A | 2/1996 | Belove et al. |
| 5,787,153 A | 7/1998 | Bankay et al. |
| 5,835,911 A | 11/1998 | Nakagawa et al. |
| 5,845,077 A | 12/1998 | Fawcett |
| 5,845,090 A | 12/1998 | Collins |
| 6,049,671 A | 4/2000 | Slivka et al. |
| 6,073,214 A | 6/2000 | Fawcett |
| 6,151,643 A | 11/2000 | Cheng et al. |
| 6,199,204 B1 | 3/2001 | Donohue |
| 6,202,207 B1 | 3/2001 | Donohue |
| 6,256,668 B1 | 7/2001 | Slivka et al. |

(Continued)

FOREIGN PATENT DOCUMENTS

EP 0809182 11/1997

(Continued)

OTHER PUBLICATIONS

Office Action mailed May 14, 2007 in U.S. Appl. No. 10/799,336.

(Continued)

*Primary Examiner*—Insun Kang
(74) *Attorney, Agent, or Firm*—Workman Nydegger

(57) ABSTRACT

A system and method for managing the installation of files on a computing device are provided. A client computing device obtains installation information identifying a version of a baseline installation component stored on the client computing device. The installation information also includes an installation component delta patch that is merged with the baseline installation component to generate an updated installation component. The updated installation component is utilized to install one or more files on the client computing device. Upon completion of the installation, the updated installation component can be deleted.

8 Claims, 14 Drawing Sheets

U.S. PATENT DOCUMENTS

| | | | |
|---|---|---|---|
| 6,327,617 B1 | 12/2001 | Fawcett | |
| 6,330,715 B1 | 12/2001 | Razzaghe-Ashrafi | |
| 6,347,398 B1 | 2/2002 | Parthasarathy et al. | |
| 6,353,926 B1 | 3/2002 | Parthesarathy et al. | |
| 6,493,871 B1 | 12/2002 | McGuire et al. | |
| 6,549,914 B1 | 4/2003 | Valys | |
| 6,618,857 B1 | 9/2003 | Zimniewicz et al. | |
| 6,701,521 B1 | 3/2004 | Mciloy et al. | |
| 6,725,377 B1 | 4/2004 | Kouznetsov | |
| 6,912,711 B1* | 6/2005 | Curtis et al. | 717/173 |
| 6,976,251 B2 | 12/2005 | Meyerson | |
| 7,003,767 B2 | 2/2006 | Larkin | |
| 7,096,464 B1 | 8/2006 | Weinmann | |
| 2002/0002703 A1 | 1/2002 | Baentsch | |
| 2002/0075824 A1 | 6/2002 | Willekes et al. | |
| 2002/0100036 A1 | 7/2002 | Moshir | |
| 2003/0033597 A1* | 2/2003 | Allsop et al. | 717/169 |
| 2003/0037325 A1 | 2/2003 | Hargrove et al. | |
| 2003/0145317 A1 | 7/2003 | Chamberlain | |
| 2004/0015961 A1 | 1/2004 | Chefalas et al. | |
| 2004/0059703 A1 | 3/2004 | Chappell et al. | |
| 2004/0076166 A1 | 4/2004 | Patenaude | |
| 2004/0088694 A1* | 5/2004 | Ho | 717/170 |
| 2004/0088700 A1 | 5/2004 | Lee et al. | |
| 2005/0172284 A1 | 8/2005 | Dandekar et al. | |
| 2005/0210459 A1 | 9/2005 | Henderson | |
| 2005/0289533 A1* | 12/2005 | Wang et al. | 717/168 |
| 2007/0061154 A1* | 3/2007 | Markvoort et al. | 705/1 |

FOREIGN PATENT DOCUMENTS

| | | |
|---|---|---|
| EP | 0841615 | 5/1998 |
| WO | 99/61983 | 12/1999 |

OTHER PUBLICATIONS

Notice of Non-Compliant Amendment mailed Jan. 8, 2008 in U.S. Appl. No. 10/799,336.

Office Action mailed Oct. 15, 2008 in U.S. Appl. No. 10/799,336.

* cited by examiner

SYSTEM AND METHOD FOR UPDATING INSTALLATION COMPONENTS USING AN INSTALLATION COMPONENT DELTA PATCH IN A NETWORKED ENVIRONMENT

FIELD OF THE INVENTION

The present invention relates to software and computer networks and, in particular, the present invention relates to a system and method for managing and communicating software updates.

BACKGROUND OF THE INVENTION

Most commercially available software products undergo a continual revision process to repair or upgrade features and/or functions. Each revision of a software product or component may require the addition of new files and/or the replacement of existing files with files of newer versions. Once a vendor has isolated a software product problem and created a solution for the problem, it would want to put that fix into an update and make the update widely available to the customers. Software vendors have a business incentive to distribute software updates to customers as quickly and trouble-free as possible.

The Internet provides an important channel for customers to obtain the latest updates for software products. The explosive growth of Internet usage has created a common expectation by customers that software products and updates be provided online for downloading. It is also in the interest of software vendors to promote the use of the Internet to distribute updates, because it reduces their costs and allows customers to obtain the fix for an identified problem as soon as the fix is made available for downloading. The vendor sites on the Internet can be designed to make it very simple to discover and locate update files for an application. The technical aspects of file download have mostly disappeared from the user's view, and are now typically handled by the operating system.

In a conventional approach, a software vendor constructs a software update as a "package" for download. This package is typically a self-extracting executable file with the setup program and each of the product's updated files embedded and compressed to make the package smaller. The size of the package is generally the sum of the compressed sizes of each changed file, plus the size of the extraction code itself. Upon execution, the package extracts each of the contained files to a temporary location, then starts the setup program to install each file to a proper location in the system's directory. Files that are shipped in a compressed form are decompressed as they are installed. Any existing file of the same name in the same location would simply be overwritten by the replacement file.

Even though the Internet makes wide and quick distribution of software updates possible, the limited bandwidth of network transmission has caused problems. The sheer sizes of common software applications have caused the download sizes of updates to become unreasonably large. Usually a multitude of fixes for a variety of problems of a product will be grouped into an update. If a vendor updates a software product on a regular basis, the download size of the update package will continue to grow, because the vendor cannot omit files under the assumption that the user already has those files from earlier updates. Because the update package combines a number of whole files, it may be quite large, even when the files are compressed. Sometimes, even on the fastest modem connections, the bandwidth efficiency of the download is decreased.

The time-consuming aspect of the conventional downloading process is, of course, undesirable. In some cases, customers pay long-distance or connection time charges during these file downloads. Any reductions in connection time will reduce the direct monetary cost for these customers. The vendors typically also have some distinguishable costs relating to the sizes of downloads they provide, so reducing the sizes may give them direct monetary benefits as well. Reducing the sizes of downloads will increase their available network bandwidth, allowing them to serve more customers with existing network server equipment.

The long time it takes to download a large update also makes the downloading process more vulnerable to various network connection problems. There are a number of reasons why an Internet session might be disconnected prematurely, including telephone line noise, call-waiting signals, and unintentional commands. Some Internet service providers enforce a connection time limit, limiting the amount of time the user can be on-line in a single session. If the user is downloading a large file when the network connection is cut off, he or she may have to start over. Most common operating systems and file transfer protocols do not allow the file transfer to be resumed, so any interim progress would be lost, and the transfer would have to be restarted. The opportunities for failure are so numerous that many users find it nearly impossible to obtain the update online. If the size of an update package is too large, users may never be able to completely download it.

One attempt to reduce the size of software updates and increase bandwidth efficiency relates to the use of delta patches, or binary patches. One skilled in the relevant art will appreciate that a delta patch corresponds to specialized software code that modifies an existing file when executed by a computing device. Because the delta patch includes specialized software code, a unique delta patch is required for each unique version of a file. As applied to software updates, a software update service can transmit a smaller sized update delta patch instead of transmitting a complete, updated file. The updated delta patch is then utilized to modify the existing file into the updated file.

Although the update delta patches can potentially reduce the amount of data required to update files, current approaches to delta patching are deficient in managing the selection of applicable delta files in situations where a large number of versions of a file exist. Because a unique delta patch is required for each version of a file, typical software update systems can often require hundreds, if not thousands, of unique delta patches to correspond to each unique version of a file. In one approach, some update services supporting delta patching transmit all possible delta patches to a client computing device. However, this approach typically increases the amount of data required to implement the software update as the number of possible update delta patches increase. Accordingly, the number of potentially applicable delta patches can quickly grow to the same size as the complete updated file. In another approach, a networked update software service scans a client machine to select which delta patch may be applicable for each client machine. Although this reduces the amount of delta patch information that is transmitted, it requires additional logic on the software update service to scan the client machines and select an applicable delta patch. The use of the additional logic increases the system resources that must be provided by the service. Further, this approach typically prevents the utilization of network caching, such as is typically achieved by traditional Web servers.

In addition to the above described shortcomings, existing systems are unable to deliver certain types of software updates, such as hardware drivers. As known in the art, specialized software updates, such as those that apply to hardware drivers, are difficult to provide to users on a large-scale distribution because most specialized software updates will only work on client computers with specific hardware. In most cases, for example, if a client computer obtains an incompatible hardware driver upgrade, the installation of the driver upgrade may cause a fatal error, or even prevent the computer from operating.

As will be readily understood from the foregoing, there is a need for a system and method having improved communication of software updates between a server and a number of clients. In addition, there exists a need for a software update system and method having improved mechanisms for allowing update services to target specific types of clients when delivering specialized updates.

SUMMARY OF THE INVENTION

A system and method for managing the installation of files on a computing device are provided. A client computing device obtains installation information identifying a version of a baseline installation component stored on the client computing device. The installation information also includes an installation component delta patch that is merged with the baseline installation component to generate an updated installation component. The updated installation component is utilized to install one or more files on the client computing device. Upon completion of the installation, the updated installation component can be deleted.

In accordance with an aspect of the present invention, a method for managing the installation of files on the client computing device is provided. In accordance with the method, a computing device obtains installation information identifying a required baseline installation component for installing one or more files on the client computing device. The computing device selects a baseline installation component stored on the client computing device. The computing device obtains an installation component delta patch from the installation information and merges the installation component delta patch from the installation information and the selected baseline installation component. The computing device installs one or more files on the client computing device utilizing the merged installation component.

In accordance with a further aspect of the present invention, a method for managing the installation of files on the client computing device is provided. In accordance with the method, a computing device obtains a package including information identifying a required baseline installation component for installing one or more files on the client computing device. The computing device identifies a baseline installation component stored on the client computing device and obtains an installation component delta patch from the package. The computing devices merges the installation component delta patch from the package and the identified baseline installation component and installs one or more files on the client computing device utilizing the merged installation component. The computing device also deletes the merged installation component upon installing the one or more files on the client computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention is directed to a system and method for managing software updates. More specifically, the present invention is directed to a system and method for facilitating the selection and implementation of software updates while minimizing the bandwidth and processing resources required to select and implement the software updates. In accordance with the present invention software updates can correspond to updates for specific software applications or operating systems. Further, software updates can include software drivers or updates to firmware, such as system BIOS. In accordance with an aspect of the present invention, a system and component architecture for processing the software updates is provided. In accordance with another aspect of the present invention, an update protocol and interface to facilitate the authorization and synchronization of client machines with an update service is provided. In accordance with a further aspect of the present invention, a method for updating an installation component and various installed files utilizing delta patches is provided. One skilled in the relevant art will appreciate, however, that additional aspects of the present invention may also be provided in the present application. Further, one skilled in the relevant art will appreciate that each identified aspect may be considered individually or as part of common inventive aspect.

Figure 1:
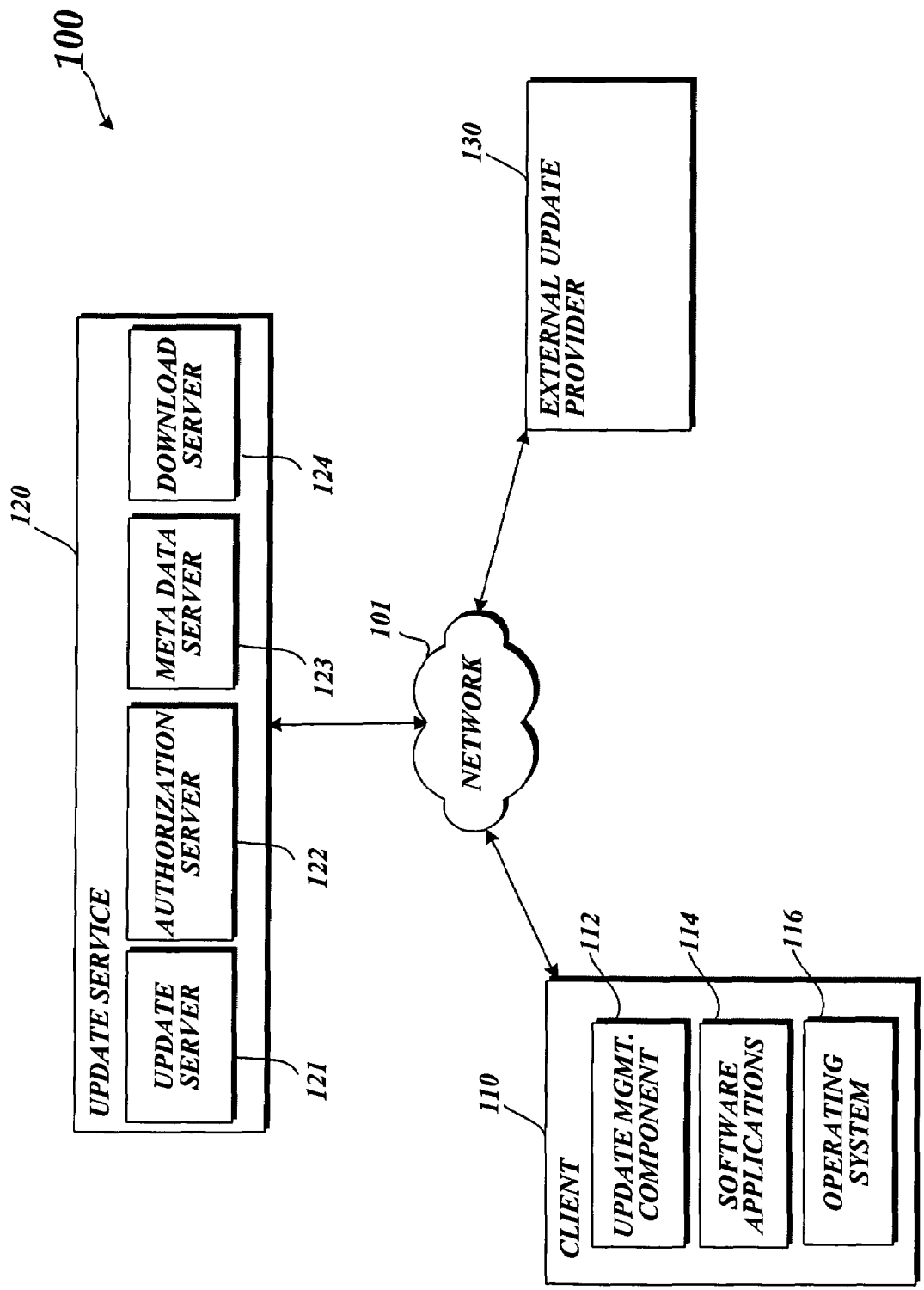
FIG. 1 is a block diagram of a software update system, including a client computer and an update service providing update software in accordance with the present invention.

FIG. 1 software update system 100 is a block diagram illustrative of software update system 100 in accordance with the present invention. Generally described, the software update system 100 may comprise one or more client computing devices 110, an update service 120 and an external update provider 130. Generally described, the update service 120 stores and manages the distribution of software updates that are communicated to and installed on the client computing device 110. The software updates may be provided by the update service 120 or by any number of external update providers 130.

The client computing device 110, the update service 120, and the external update provider 130 electronically communicate via a network 101. The network may be a local area network (LAN) or a larger network, such as a wide area network (WAN) or the Internet. By the use of generally known software, the software update system 100 may be configured to exchange documents, commands, and other known types of information between the client computing device 110 and the servers 121, 122, 123 and 124 of the update service 120. As will be appreciated by those skilled in the art and others, the software update system 100 shown in FIG. 1 is a simplified example of one suitable system for implementing the present invention and that the present invention is not limited to this example.

As will be described in more detail below, one embodiment the update service 120 comprises a number of servers. As shown in FIG. 1, the update service 120 includes an update server 121 for managing the overall processes of the update service 120 and coordinating processes of the servers 121, 122, 123 and 124 of the update service 120. The authorization server 122 generates authorization cookies as requested by the client and, in turn, the authorization cookies are used to generate server cookies, that allow client computers to access updates provided by the update service 120. The metadata server 123 provides general information regarding the updates provided by the update service 120. The metadata server 123 allows the system of the present invention to identify specific updates for a specific type of client computer or a specific group of client computers. The download server 124 provides one or more software components for delivering data files associated with software updates provided by the update service 120.

The external update provider 130 may include one or more servers that distribute software updates. The external update provider 130 may be associated with an entity that provides software, software updates, or other data that is to be distributed to groups of client computers. For example, the external update provider 130 may be associated with a third party software developer desiring to use the update service 120 to distribute updates for one or more software applications. In another example, the external update provider 130 may be associated with software update system 120.

The client computing device 110 may be any computing device that stores and executes software applications 114. The client computing device 110 may be formed from any one of a number of different computer products including, but not limited to, personal computers (PCs), personal digital assistants (PDAs), mobile telephones, two-way pagers, etc. As will be appreciated by those of ordinary skill in the art or others, the architecture of the client computing device 110 may take on any suitable form. For example, the client computing device 110 may include a network interface for providing communication with the network 101. The network interface may be configured for use with any wired or wireless network connection, and may be used with any suitable communication protocol, such as the TCP/IP protocol. In addition, the client computing device 110 may include a processing unit, a display, and a memory unit. The memory unit may store the program code necessary for operating the client computing device 110, such as an operating system 116. In addition, the memory unit stores an update management component 112 for controlling and executing processes of the present invention.

The software update system 100 stores software programs that, when executed, implement the present invention. When executed, the software update system 100 stores, manages, and selectively communicates software updates. As described more fully below, among many other benefits, the present invention provides a mechanism for defining and selecting target groups of client computing devices that are eligible to receive software updates. The present invention also provides an improved mechanism for downloading data files associated with software updates.

For purposes of illustrating the present invention, a detailed description of a working example of the present invention is provided. In describing the working example, reference is made to software updates that may refer to a specific upgrade of a software application, e.g., an upgrade of a media player version 6.0 to media player version 7.0. As will be appreciated by those of ordinary skill in the art, such a software update may include the communication and installation of a number of data files associated with the software update. Thus, for purposes of illustrating the present invention, a distinction is made between a software update and an individual data file containing a software update.

Figure 2:
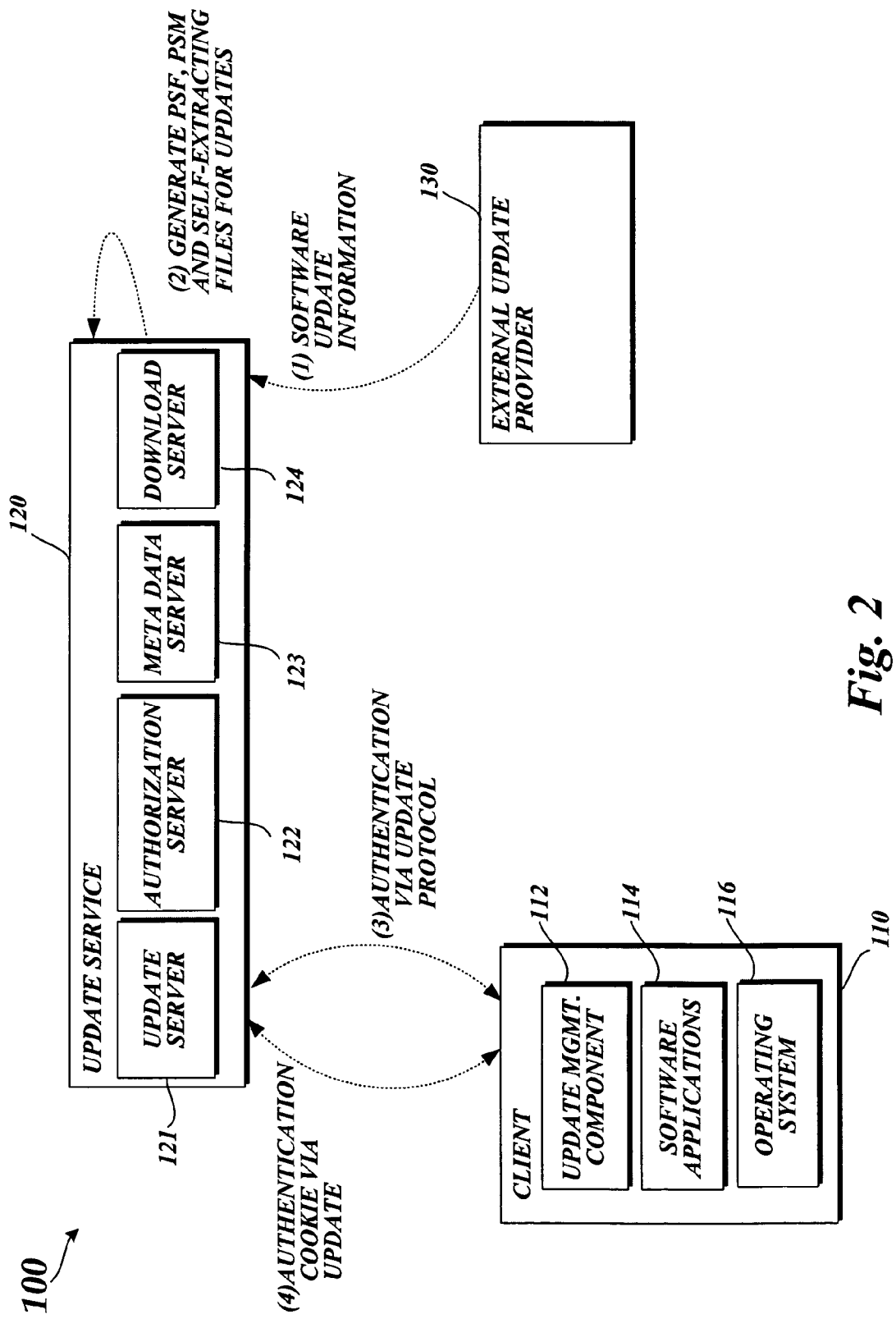
FIG. 2 is a block diagram of the software update system of FIG. 1 illustrating the authentication of a client computing device with the update service in accordance with the present invention.

With reference now to FIGS. 2-6, an illustrative interaction between the components of the software update system 100 to update one or more files on the client computing device 110 will be described. With reference to FIG. 2, the software update service is initiated by the transmission of software update information by one or more external update providers 130. As described above, the external update providers 130 may be associated with software update system 100. Alternatively, the software update information may be transmitted by third-party external update providers 130. In an illustrative embodiment of the present invention, the software update information can include software code utilized to update a file, software code utilized to replace a file, various rules for determining the applicability of the software updates, and/or display information describing the software update. The transmission of the software update information may be completed at any time and does not have to be contemporaneous with the initiation of the other illustrated software update component interactions.

Upon receipt of the software update information from the external update provider 130, the update service 120 generates one or more pieces of data to facilitate the transmission of update information. The data can include a patch storage file that corresponds to a set of software delta patches for updating different versions of a file. The data can also include a patch storage manifest that corresponds to an index mapping particular file versions to a corresponding delta found in the patch storage file. The data can further include a self-extracting file that corresponds to information the update agent will utilize to request and install specific software update data, as will be described in greater detail below. One skilled in the relevant art will appreciate that the generation of the patch storage file, patch storage manifest, and the self-extracting files may be completed at any time and does not have to be contemporaneously with the other illustrated component interactions.

Figure 3:
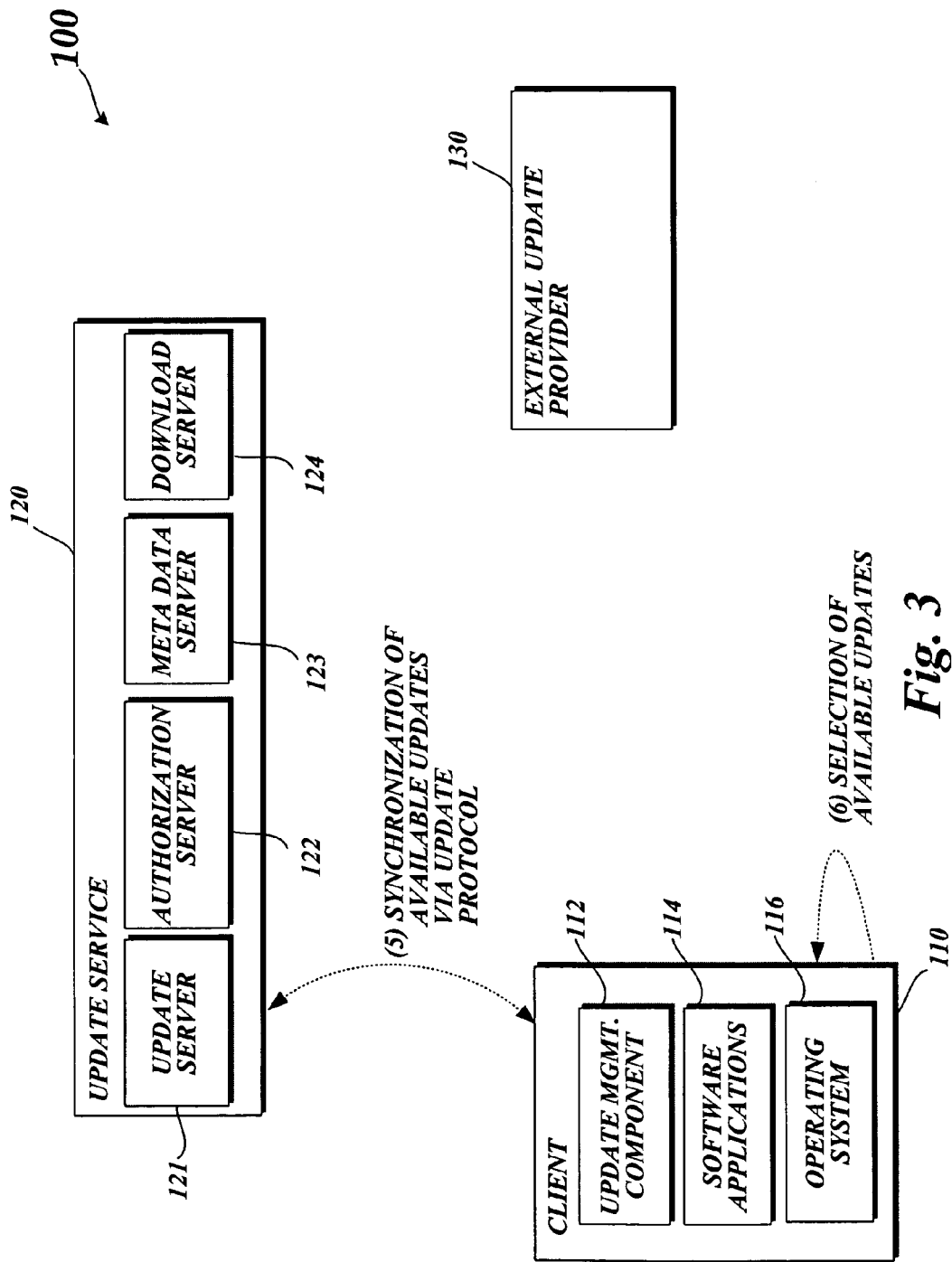
FIG. 3 is a block diagram of the software update system of FIG. 1 illustrating the synchronization of available updates between a client computing device and the update service in accordance with the present invention.

To initiate the transmission of software update information to clients, a client computing device 110 initiates an authentication request to the update service 120. In an illustrative embodiment of the present invention, the authentication request corresponds to an update protocol interaction between the client computing device 110 and the update service 120, which will be described in greater detail below. Upon completion of the authentication, the update service 120 transmits an authentication cookie to the client computing device 120. With reference now to FIG. 3, the authenticated client computing device 120 then initiates the synchronization of the available updates with the update server 120. In an illustrative embodiment of the present invention, the synchronization request also corresponds to the update protocol interaction between the client computing device 110 and the update service 120, which will be described in greater detail below. Upon the completion of the synchronization, the client computing device 110 receives the information of all applicable software updates and information describing the updates. However, in an illustrative embodiment of the present invention, no software code to instantiate the update has been downloaded.

With continued reference to FIG. 3, at sometime during the update process, a selection of the updates to be installed is received. In an illustrative embodiment of the present invention, a user may be presented with software update information received during synchronization and asked to select an appropriate update. Alternatively, the client computing device 110 may be configured in a manner to automatically select all applicable software updates. Further, the client computing device 110 may also have some rules that allow it to automatically select a subset of the available software updates. Still further, a user may initiate a selection of an update by communicating with the update service 120, such as via an internet Web page.

Figure 4:
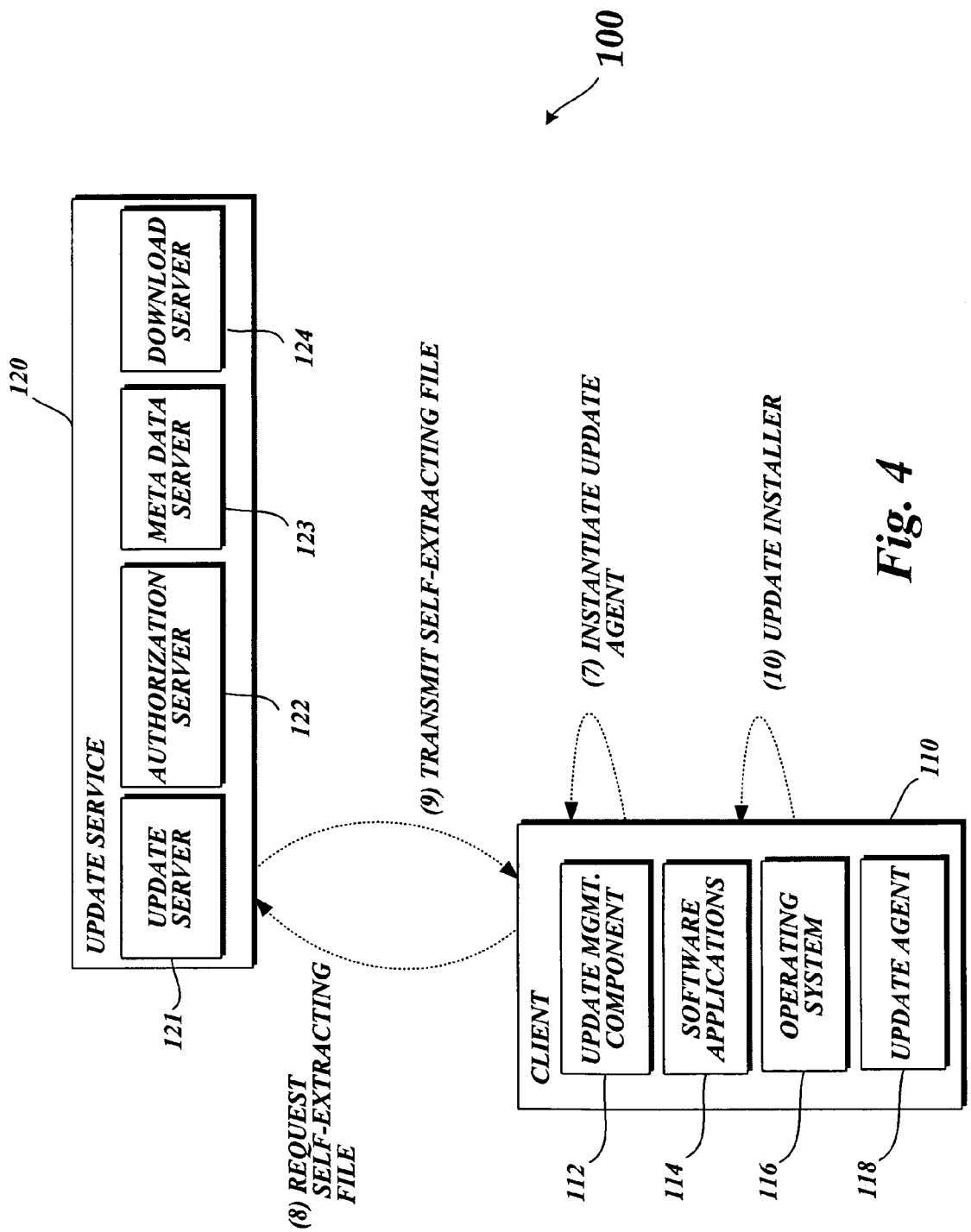
FIG. 4 is a block diagram of the software update system of FIG. 1 illustrating the transmission of software update information to a client computing device from the update service in accordance with the present invention.

With reference now to FIG. 4, the update management component 112 instantiates an update agent 118 on the client computing device 110, if an update agent is not already present. The update agent 118 then requests the transmission of a software update information package, such as self-extracting file. The update agent 118 receives the self-extracting file and performs any updates to the installer, as will be described below. Further, the update agent 118 can request any missing or corrupted information from the update service 120.

Figure 5:
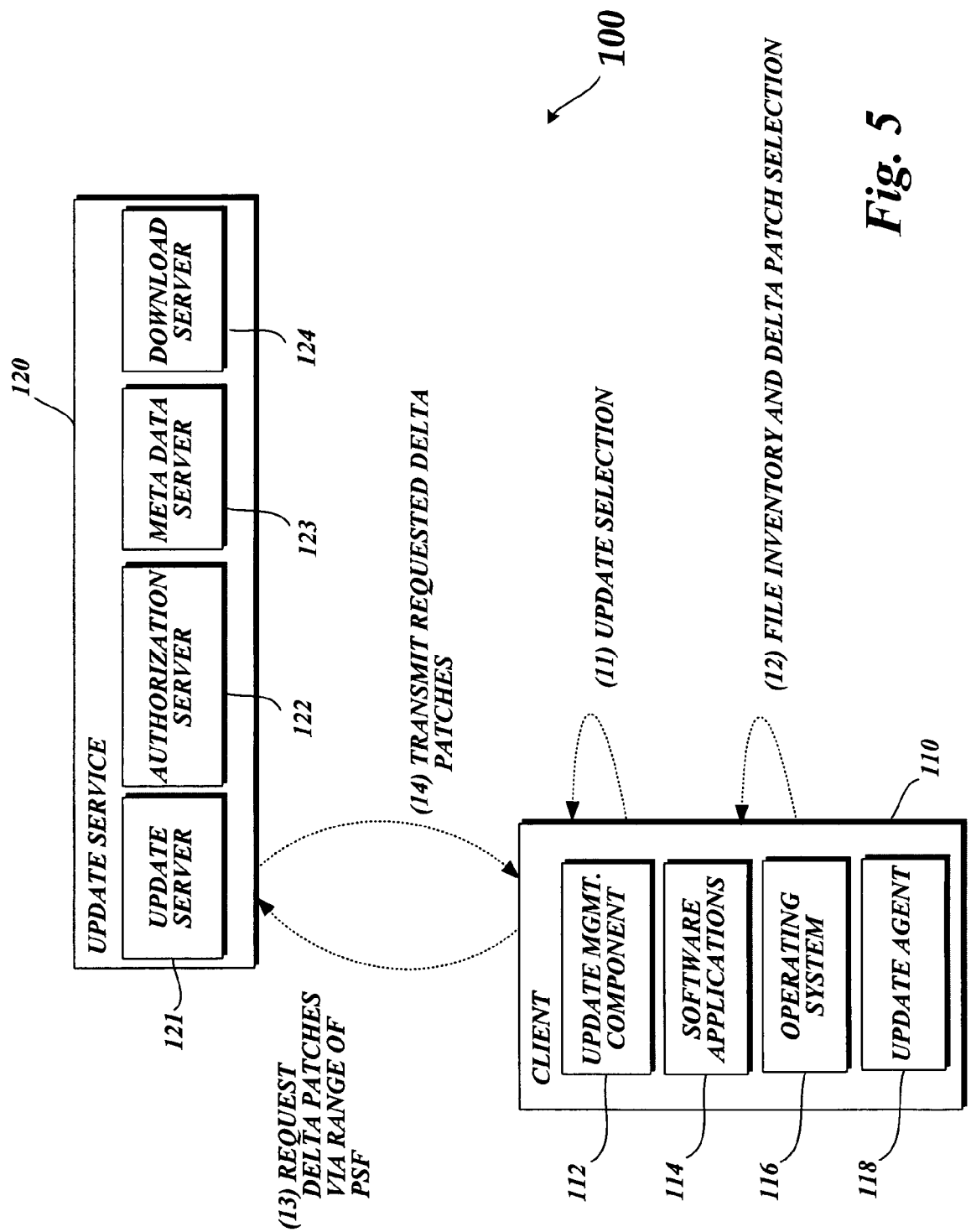
FIG. 5 is a block diagram of the software update system of FIG. 1 illustrating the processing and selection of update information by a client computing device in accordance with the present invention.

With reference now to FIG. 5, once the update agent 118 receives the software update information package, the update agent 118 performs an inventory of the files that are installed on the client computing device 110. Based on a comparison of the inventory and the software update information package, the update agent 118 determines which delta patch, or other update information, will be required to complete the selected updates. The update agent 118 then transmits a request for specific delta updates. In one embodiment of the present invention, the request for software updates may correspond to a direct request transmitted via a direct network connection, which will be referred to as a manual update. In another embodiment of the present invention, the request for software updates may be a background request that is transmitted without requiring overt user action. This embodiment will be referred to as an automatic update.

In an illustrative embodiment of the present invention, if the software update corresponds to a delta patch, the update agent 118 transmits a request to the update service 120 that identifies the particular delta patch identified by the patch storage manifest. Alternatively, in the event that a delta patch is unavailable or if several delta patches have failed, the update agent 118 can initiate a fallback procedure. The fallback procedure can include a request for the transmission of a complete copy of the entire updated file from the patch storage file. The fallback procedure can also include a request for the transmission of a complete copy of the entire updated file from in self-contained package.

In an illustrative embodiment of the present invention, the download server 124 of the update service 120 can directly process the software update request from the update agent 118. Alternatively, the request can also be processed by any number of additional external download servers such as traditional Web servers that have either received the requested update delta patches from the update service 120. For example, a corporation may utilize an internal server to update client machines. Additionally, the request can be processed by external download servers in which some, or all, of the update delta patches are cached in processing previous requests. Accordingly, in this embodiment, the download can be distributed to a number of additional download servers capable of servicing hyper text transfer protocol ("HTTP") data requests.

Figure 6:
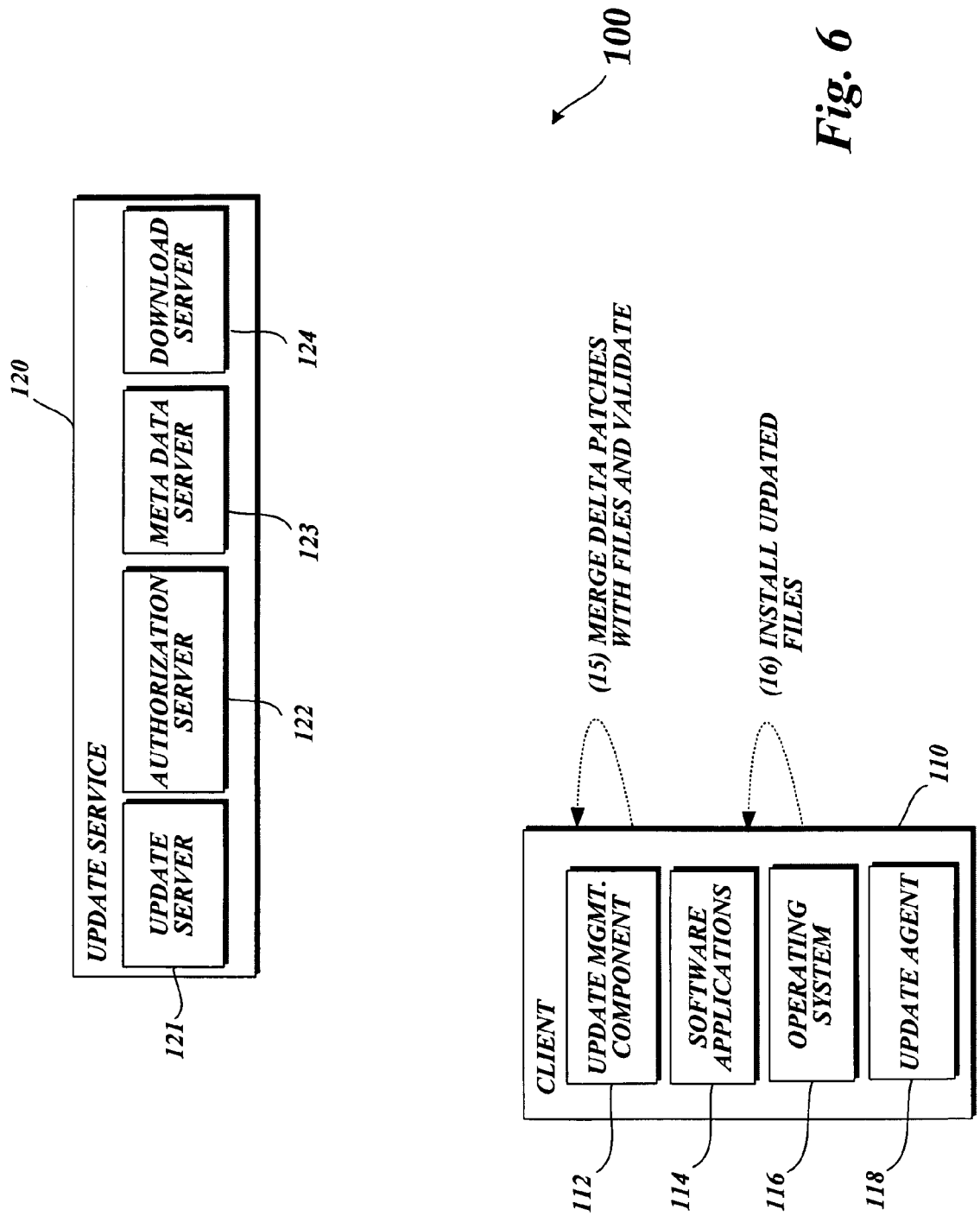
FIG. 6 is a block diagram of the software update system of FIG. 1 illustrating the merging of delta patches and installation of updated files by a client computing device in accordance with the present invention.

With reference to FIG. 6, once the software update information is received, the update agent 118 merges the delta patch with the installed file to generate an updated file. Additionally, the update agent 118 can validate whether the merger successfully updated the appropriate file. As described above, if a delta patch cannot be validated, the update agent 118 may request the delta patch again or request an entire updated file after a number of failures. Once the update agent 118 obtains the validated and update file, the file is installed on the client computing device 110.

Figure 7:
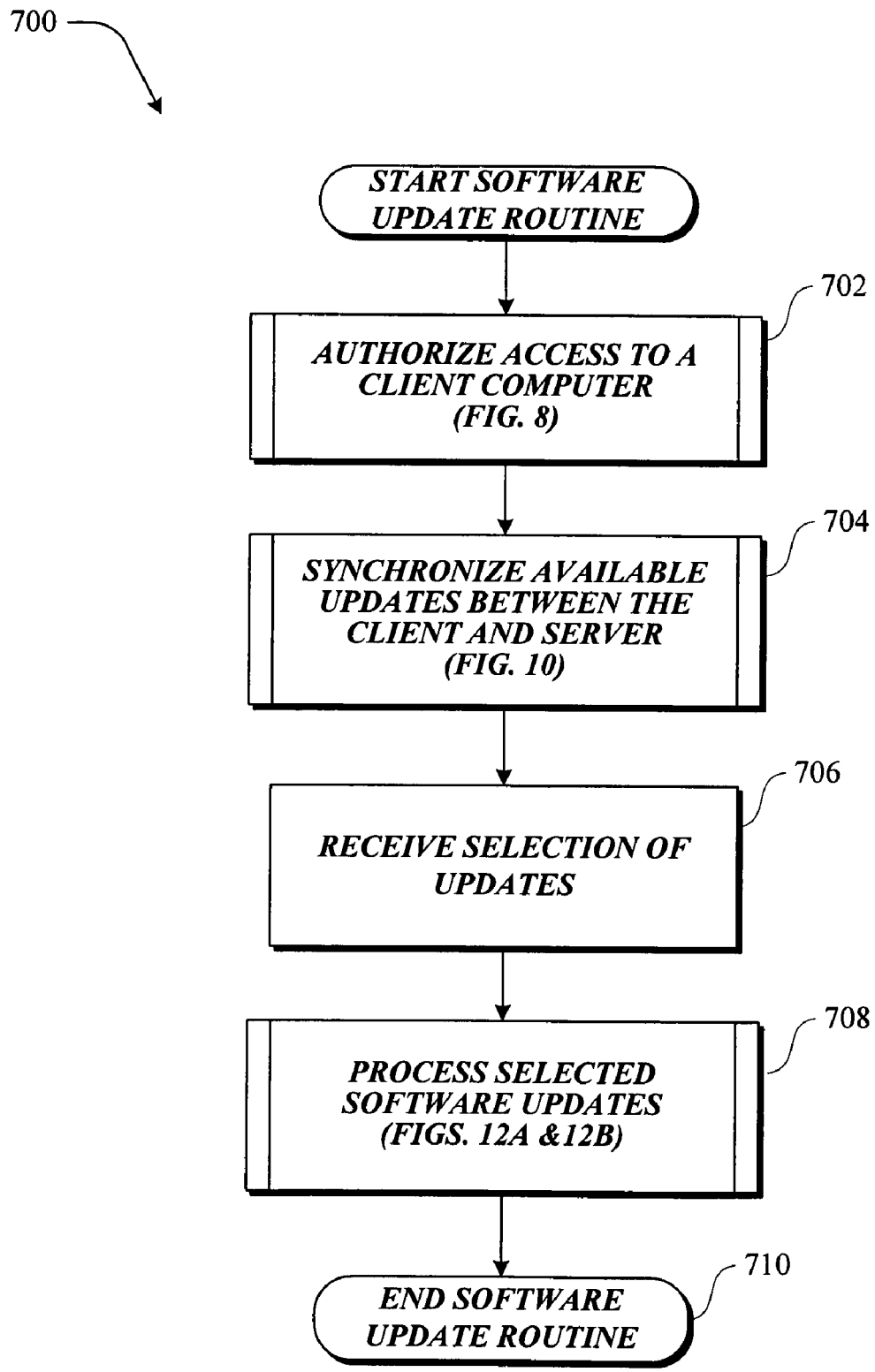
FIG. 7 is a flow diagram illustrative of a software update routine implemented by a client computing device and an update service for identifying software updates available for installation on the client computing device, in accordance with the present invention.

FIG. 7 is a flow diagram of a software update processing routine 700 illustrating the interaction between a client computing device 110 and the software update service 120 in accordance with the present invention. At block 702, the software update service 120 authorizes access to the client computer 110. In an illustrative embodiment of the present invention, the authorization of access to the client computer can include the generation of a server-issued cookie for allowing access to software updates that are associated with a particular group of computers. A more detailed explanation of the authorization process will be described with regard to FIG. 8.

At block 704, the client computer 110 and the software update service 120 synchronize update information. In an illustrative embodiment of the present invention, the software update service 120 transmits metadata describing specific software updates to the client computing device 110. The metadata contains information describing the available software updates to allow a user to select one or more updates for installation. A more detailed description of the synchronization process will be described below with regard to FIGS. 9 and 10. At block 706, the client computing device 110 obtains a selection of applicable updates to download. In an illustrative embodiment of the present invention, the selection of applicable updates can correspond to the utilization of a number of unique user interfaces to facilitate user selections. The selection of user interfaces will be described in greater detail with regard to FIG. 11.

At block 708, the client computing device 110 processes the user selection of applicable software updates and interfaces with the software update service 120 to request specific update information. In an illustrative embodiment of the present invention, the client computing device 110 selects and requests one or more applicable update delta patches. The update agent 118 on the client computing device 110 can then process the requested data to implement the selected software update. At block 710, the routine 700 terminates.

Figure 8:
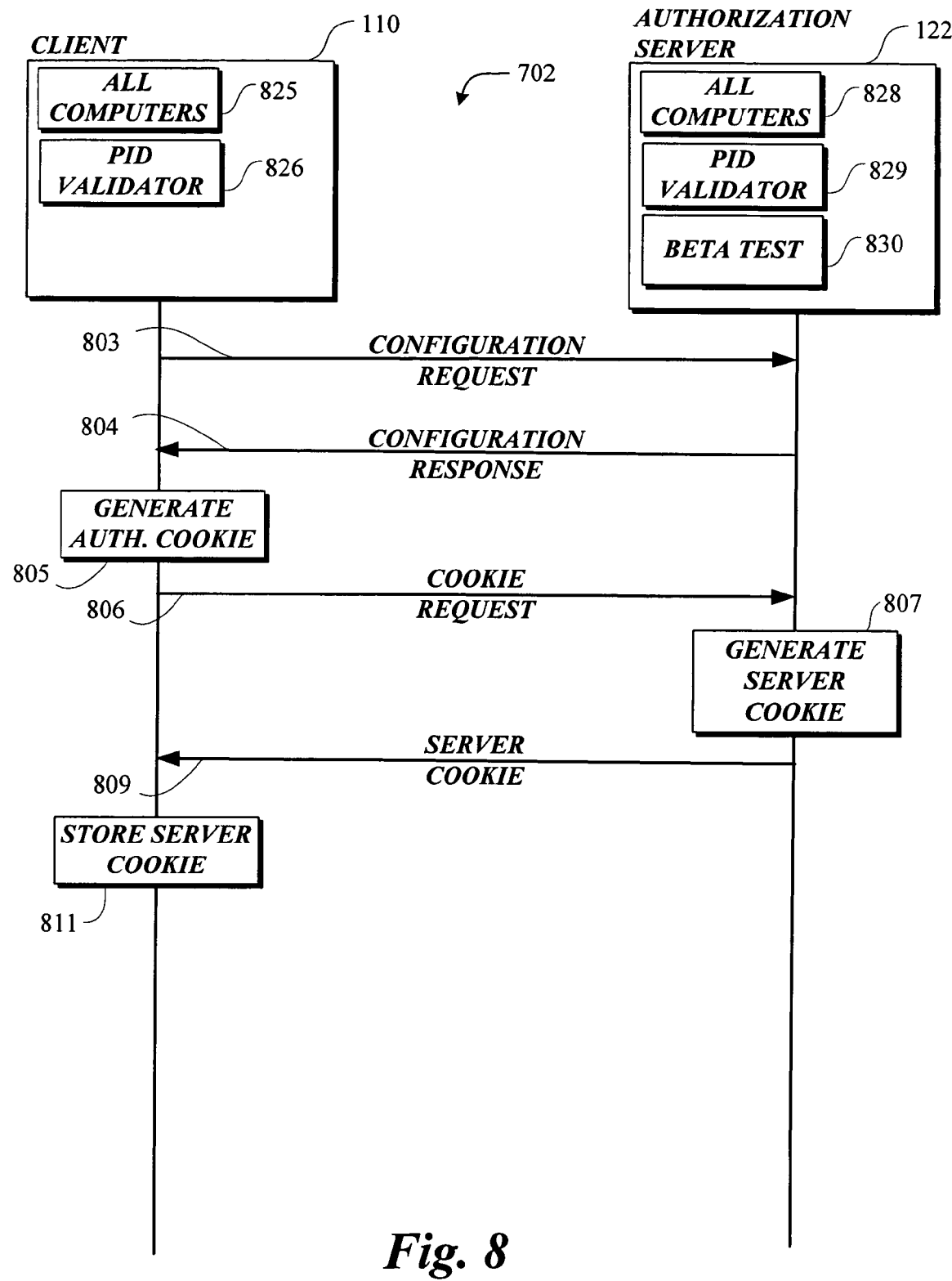
FIG. 8 is a protocol diagram of an authorization routine for providing selective access to updates stored on the update service, in accordance with the present invention.

With reference to FIG. 8, a protocol diagram 800 for authorizing access to client computing devices 110 and corresponding to block 702 (FIG. 7) will now be described. In an illustrative embodiment of the present invention, the software update service 120 utilizes an extensible targeting mechanism to control client computing device 110 access to updates and other software. The software update service 120 incorporates a mechanism that associates specific software updates with one or more target groups of client computing devices 110. For example, the software update service 120 may limit access of a specific hardware driver update to a particular brand of client computing devices 110 having a specific hardware device. In such an example, the software update service 120 may define a target group of client computing devices 110 having a particular brand name and a specific hardware device and limit the transmission of the particular software download to the target group.

In an illustrative embodiment of the present invention, the extensible targeting mechanism is facilitated by the use of software components ("authorization plug-ins") that define a client computing device's membership to one or more target groups. The presence of an authorization plug-in on a client computing device 110 defines whether the client computing device belongs to the specific target group of the authorization plug-in. A target group, for example, may include all computers having a valid product identification ("PID") number for a particular software application. In such an example, as described in more detail below with respect to FIG. 8, an authorization plug-in 826 may be installed in the client to read a PID from a memory module of the client computing device and pass the obtained PID to a corresponding PID server plug-in 829. The corresponding PID plug-in, also referred to herein as PID validator 829, utilizes one or more methods to determine if the received PID is valid. Once it is determined that the PID stored on the client computing device 110 is valid, the server generates a server cookie which indicates that the client computing device 110 is a member of a target group having a valid PID. In another example, a target group may include client computing devices that are designated as beta test computers.

In an illustrative embodiment of the present invention, the authorization server 122 of the software update service 120 contains a number of server authorization plug-ins that define a set of target groups of client computing devices that the authorization server will recognize. Each server authorization plug-in contains components for communicating data with a corresponding client authorization plug-in stored on a client computing device 110. In a similar manner, each client computing device 110 includes one or more client authorization plug-ins that identifies the target groups to which the client belongs. In an illustrative embodiment of the present invention, the client authorization plug-ins can be installed in each client computing device during the installation or upgrade of a software application, such as the installation or upgrade of an operating system. Additionally, the server authorization plug-ins may be dynamically installed or removed by an administrator desiring to control the access to software updates. The authorization plug-ins stored on the client computing device 110 and the authorization server 122 can be an actual software plug-in, or the authorization plug-ins can be hard coded into dynamically linked libraries.

As shown in FIG. 8, the authorization server 122 contains three example server authorization plug-ins: (1) a first server authorization plug-in 828 defining a target group that includes all computers (hereinafter the "All Computers target group"); (2) a second server authorization plug-in 829 defining a target group that includes computers having a valid PID (hereinafter the "PID target group"); and (3) a third server authorization plug-in 830 defining a target group that includes beta test computers (hereinafter the "beta target group"). Also shown in FIG. 8, the client computing device 110 contains two client authorization plug-ins: (1) a first client authorization plug-in 825 indicating that the client computing device 110 is a member of the All Computers target group; and (2) a second client authorization plug-in 826 indicating that the client computing device 110 is a member of the PID target group. In this example, the client computing device 110 does not contain an authorization plug-in indicating that it is a member of the beta target group. As will be appreciated by those of ordinary skill in the art, each client authorization plug-in 825 and 826 may be configured to execute one or more functions on the client computing device 110 to assist the validation process. For instance, the second client authorization plug-in 826 may be configured to examine the memory of the client computing device 110 to verify or obtain a PID for an installed software application.

As shown in FIG. 8, the authorization sub-routine 702 begins when the client computing device 110 communicates a configuration request 803 to the authorization server 122. In an illustrative embodiment of the present invention, the configuration request 803 is formed from any suitable software component configured to obtain information describing the authorization plug-ins stored on the authorization server 122. As will be appreciated by those skilled in the art, the configuration request 803 may utilize a known method referred to as "GetConfig." In response to receiving the configuration request 803, the authorization server 122 communicates a configuration response 804, which includes information identifying all of the authorization plug-ins stored on the authorization server 122. In one embodiment, the configuration response 804 includes an array of strings that identifies and describes all authorization plug-ins stored on the authorization server 122. In the present example, the configuration response 804 includes information that identifies the first server authorization plug-in 828, the second server authorization plug-in 829, and the third server authorization plug-in 830.

At block 805, the client computing device 110 generates one or more authorization cookies in response to receiving the configuration response 804. In the process of block 805, the client computing device 110 generates an authorization cookie for each pair of matching client and server authorization plug-ins. Thus, in the present example, the first client authorization plug-in 825 generates a first authorization cookie associated with the All Computers target group because the first client authorization plug-in 825 and the first server authorization plug-in 828 are both associated with the All Computers target group. In addition, the second client authorization plug-in 826 generates a second authorization cookie associated with the PID target group because the second client authorization plug-in 826 and the second server authorization plug-in 829 are both associated with the PID target group. A third authorization cookie is not generated since the client computing device 110 does not have an authorization plug-in indicating that it is a member of the beta target group.

As will also be appreciated by those skilled in the art, one implementation of the process of block 805 may include the use of a generally known software method referred to in the art as "GetAuthCookie." It will also be appreciated that the generation of each authorization cookie may involve additional processing. For instance, the second client authorization plug in 826 may be configured to examine information stored in the client's system registry to retrieve a PID and include the PID in the authorization cookie. In other examples, the process of block 805 may include processes for communicating with other computers or devices. For instance, a client authorization plug-in may communicate with a device, such as a sound card, scanner, video card, etc., to obtain the make and model of the device. In other non-limiting examples, a client authorization plug-in may communicate with a security device, such as a fingerprint reader, to obtain information describing a user.

In general, a client authorization plug-in may read configuration information from any component of the client computing device 110 or any other computing device communicatively connected to the client computing device 110. In other examples, a client authorization plug-in may be configured to utilize one or more public or private application programming interfaces (APIs) to gather and encrypt information from the client that will be validated by the corresponding server plug-in. In such examples, PID validator plug-in 826 uses a private API to encrypt the client's PID to pass the encrypted PID to the server for decryption and validation. In other embodiments, other client authorization plug-ins may utilize biometric measurements, such as fingerprint readers or voice prints, to construct an authorization cookie to be passed to the server for validation. In yet another example, a client authorization plug-in may call a Web service or any other service to communicate authorization credentials or any other type of data to the authorization server 122.

In an illustrative embodiment of the present invention, each authorization cookie includes a string that identifies an associated target group. For example, a string may indicate that a particular authorization cookie is associated with the PID target group. Each authorization cookie also includes a data section for communicating data between a client and a server. For example, an authorization cookie associated with the PID target group may have a data section that contains an actual PID. As will be appreciated by those of ordinary skill in the art, the data section can contain any type of data that is stored in any format, such as a byte array. For example, if plug-ins on the client and the server require the communication of public and private keys, such data can be encrypted in the data section of one or more authorization cookies.

Once the client computing device 110 generates an authorization cookie for each pair of corresponding client and server authorization plug-ins, the client computing device communicates the generated authorization cookies to the authorization server 122. As shown in FIG. 8, the client computing device 110 communicates the authorization cookies in a cookie request 806. The cookie request 806 includes any suitable format for communicating an array of the authorization cookies generated in the process of block 805. One implementation of this part of the authorization method 702 may include the use of a generally known software method referred to in the art as "GetCookie."

In one embodiment, the cookie request 806 also includes other authorization server cookies stored in the memory of the client computing device 110. As will become more readily understood from the following description, the memory of the client computing device 110 may store old authorization server cookies that were created in previous executions of the authorization routine 700. By providing the stored authorization server cookies in the cookie request 806, the client computing device 110 will be able to maintain its access privileges that were granted in the previous executions of the authorization sub-routine 702. In the present example, since there are no authorization server cookies stored in the client, the cookie request 806 includes the first authorization cookie associated with the All Computers target group and the second authorization cookie associated with the PID target group.

Next, as shown in block 807, in response to receiving the cookie request 806, the authorization server 122 generates a server cookie. In one embodiment, for each of the received authorization cookies, a call is made to an appropriate server authorization plug-in to generate server cookie data. The server cookie data generated by each server authorization plug-in includes an identifier for each target group identified in the received authorization cookies. In the present example, since the cookie request 806 includes the first authorization cookie associated with the All Computers target group and the second authorization cookie associated with the PID target group, the authorization server 122 generates server cookie data containing an identifier for these respective target groups. On the authorization server 122, the server cookie data is then combined with data of old server cookies, if an old server cookie is received in the cookie request 806, to generate a new server cookie. In one embodiment, the new server cookie is encrypted by the use of a publically available encryption method, such as Triple DES.

In an illustrative embodiment of the present invention, the server cookie can include encrypted information that identifies one or more associated target groups. In addition, the server cookie can include expiration data, which is stored in both a clear text format and an encrypted format. The expiration data stored in the clear text format is used by the client computing device 110 for monitoring for the expiration of the server cookie. The expiration data stored in the encrypted format is used by software update service 120 to determine if the client computing device 110 is authorized to receive updates associated with a particular target group. In one embodiment, the expiration data of the server cookie applies to all target groups identified in the server cookie. Alternatively, or in addition to the expiration time that applies to the entire server cookie, the server cookie may include a plurality of expiration data, each of which may apply to individual target groups. As will be appreciated by those of ordinary skill in the art, each server cookie can include additional data. For instance, a server cookie may be configured to store client state information, such as a time stamp of the last execution of the authorization sub-routine 702.

Once generated, the authorization server cookie 809 is communicated from the authorization server 122 to the client computing device 110. Next, as shown in block 811, the server cookie is then stored in the memory of the client computing device 110. When the client computing device 110 determines that at least one component of the server cookie has expired, the client computing device can re-execute the authorization method 702 to obtain a new server cookie. As mentioned above, in each subsequent execution of the authorization method 702, the client computing device 110 may communicate its stored server cookies to the authorization server 122 in the cookie request 806. In one embodiment, the client does not have to send the request 803 unless the server informs the client that the server configuration has changed, i.e., a new authorization plug-in has been added.

In accordance with another aspect of the present invention, the software update service 120 may provide a synchronization sub-routine for synchronizing update information between the metadata server 123 and the client computing device 110. By the use of a unique software update hierarchy, the synchronization sub-routine can efficiently identify specific updates that apply to a particular client computing device. In addition, by the use of the server cookie generated in the authorization sub-routine 702, the synchronization sub-routine can selectively grant access to updates associated with specific target groups.

In accordance with an illustrative embodiment of the present invention, each software update includes three components: (1) an instruction component; (2) a localized data component; and (3) a data component. As will be appreciated by one of ordinary skill in the art, each update may have one or more of the above-described components. For example, an update may contain an instruction component, a localized data component, and a data stream component. In another example, an update may only contain an instruction component for testing one or more conditions of a client computing device. The various components of the software updates are described in more detail below.

Figure 9:
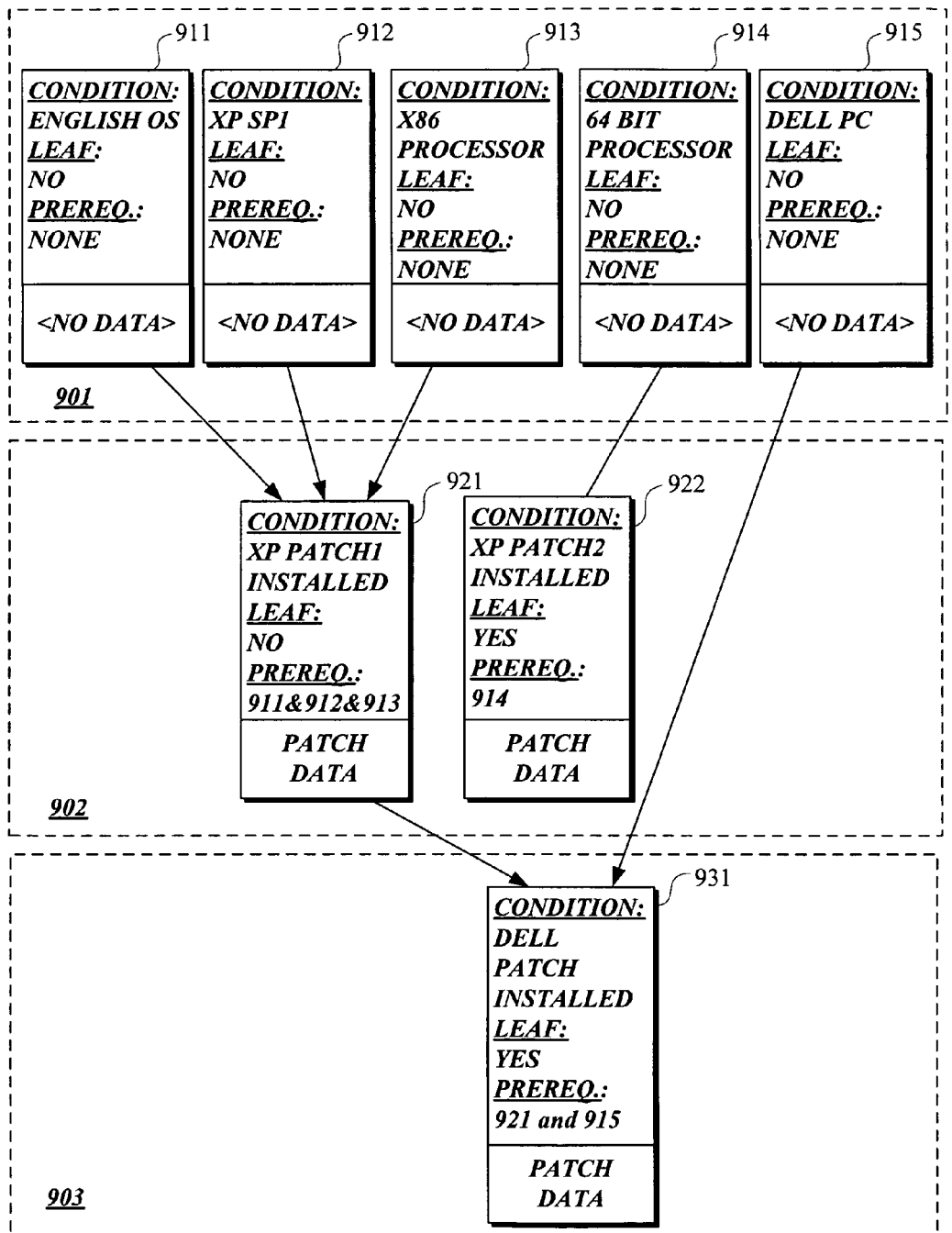
FIG. 9 is a block diagram of an example set of software updates illustrating an authorization routine, in accordance with the present invention.

Generally described, the instruction component contains two sub-components: (1) an applicability rule that defines one or more conditions to be tested by a client computing device 10; and (2) a set of prerequisites that identifies one or more updates that are required for proper installation of an individual update. As described below, the applicability rule can define a number of conditions related a computer, and each of the conditions can be associated with other conditions by the use of any logical operators. For example, the instruction component may include an applicability rule to determine if a computer has a particular version of Windows® installed. As also described below, the set of prerequisites can identify one or more updates that are required to have been previously installed. For example, as described in more detail below with reference to FIG. 9, an individual update may contain a prerequisite that lists other updates required for the proper installation of the individual update. In other examples, as is also shown in FIG. 9, the set of prerequisites can include the use of logical operators to define more complex prerequisites rules.

The instruction component also contains code, such as a Boolean flag, that indicates if there are other updates that depend from a particular update. For illustrative purposes, an update is considered to be a LEAF update if there are no other updates that depend from a particular update. The Boolean flag that is used to indicate if an update is a LEAF is dynamically updated by the metadata server 123 as related updates are added or removed.

The localized data component of each update includes general information describing the update. For instance, the localized data component may include information describing the features and benefits of the update. The localized data component may also include a text description of the installation procedures of the update. In addition, the localized data component may include any other data or information related to the update. For instance, the localized data may indicate that an update is a high priority update. In another example, the localized data may provide special installation messages, such as a message that indicates that an update cannot be installed with other software updates. The localized information may be in a format that allows for the display of its contained information to a user.

The data component of each update includes one or more binary data streams of the update. In one embodiment, the data component of each update may be associated with one or more data files, such as an executable file, a document, a linked library, etc. As described in more detail below, each update may be associated with a combination of data files, each of which facilitates the actual upgrade, installation, or modification of software used by the client. For instance, the installation of an update may be facilitated by the use of a single CAB file including all the information required to complete a selected update. Alternatively, the installation of the update may be facilitated by use of a number of individual updates used to update one or more files stored on a client computing device.

In an illustrative embodiment of the present invention, software updates can be arranged in a hierarchy that allows for controlled distribution of the software updates. Generally described, the hierarchy of updates defines relationships between the updates and specifically indicates which updates are dependent on other updates. For illustrative purposes, an example set of updates is provided and shown in FIG. 9. As shown, a hierarchy of sample updates 900 includes a base set of updates 901, a second set of updates 902, and a third set of updates 903. In general, each update in the base set of updates 901 does not have a prerequisite that requires the installation of other updates. However, the sixth update 921 contains a prerequisite that requires the installation of the first update 911, the second update 912, and the third update 913. The seventh update 922 contains a prerequisite that requires the installation of the fourth update 914. The eighth update 931 contains a prerequisite that requires the installation of the sixth update 921 and the fifth update 915. Hence, the eighth update 931 also requires the installation of the first update 911, the second update 912, and the third update 913. For purposes of illustrating the present invention, it is given that all of the updates of the sample set of updates 900 are all associated with the All Computers target group and the PID target group.

Also shown in FIG. 9, and as described in more detail below, each update contains an applicability rule that specifies conditions for the installation of the update. For example, the first update 911 requires the installation of an English version of an operating system. The second update 912 requires the installation of Windows® XP version SP1. In another example, the sixth update 921 requires the installation of a software patch referred to as the XP PATCH1. Accordingly, the client computing device 110 will not install the updates if the applicability rules have not been satisfied.

FIG. 9 also shows the section of the instruction component that indicates if there are other updates that depend from a particular update. This section is referred to as a LEAF, which may be in the form of a Boolean value indicating that a software update is the last update of a series of related updates. For purposes of illustrating the invention, a particular update is a LEAF update if no other updates list that particular update as a prerequisite. As shown in FIG. 9, the seventh update 922 and the eighth update 931 are the only two LEAF updates.

Figure 10:
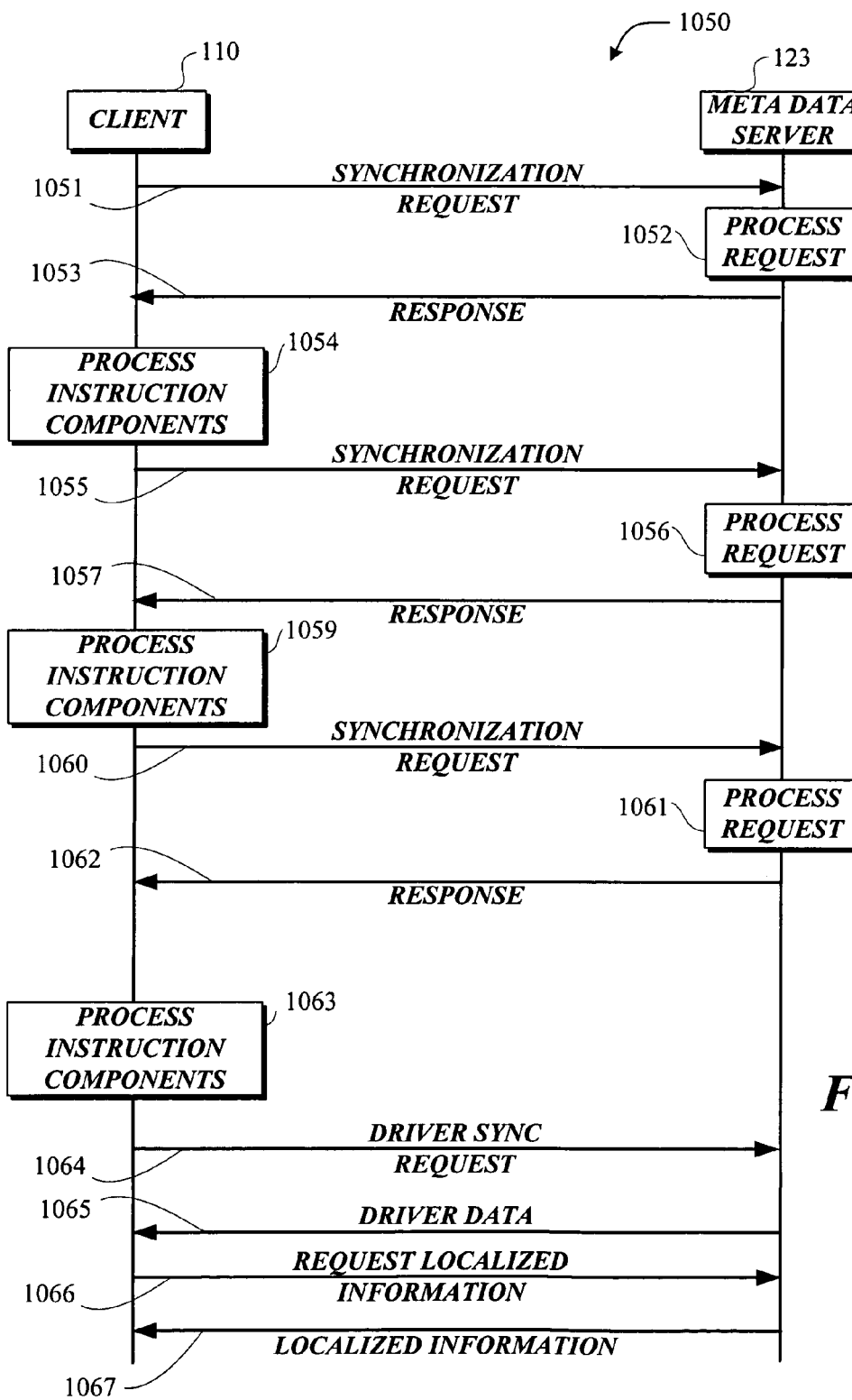
FIG. 10 is a protocol diagram of a synchronization routine for communicating a select group of software updates from a software update service to a client computing device, in accordance with the present invention.

FIG. 10 illustrates a protocol diagram of a synchronization sub-routine 704 (FIG. 7) formed in accordance with the present invention. Generally described, the synchronization sub-routine 704 selectively communicates the instruction components of certain updates between the client computing device 110 and a server, such as the metadata server 123, to identify updates that can be applied to the client computing device 110. As shown in FIG. 10, to initiate an update, the client computing device 110 first processes installed updates and communicates a synchronization request 1051 to the metadata server 123 requesting one or more updates available to the client. In response to receiving the synchronization request 1051, the metadata server 123 returns a number of updates to the client computing device 110. As will be more readily understood from the following description, the client computing device 110 processes locally-stored data prior to the communication of the synchronization request 1051.

The client computing device 110 processes the instruction components of each received update to determine if the condition defined in the applicability rules can be met. If the condition defined in an individual update is met, for purposes of illustrating the synchronization sub-routine 1050, the individual update is "installed," and the installed update is saved in a first component of the client's update cache. On the other hand, if the condition defined in an individual update is not met, individual update is considered to be "failed," and the failed update is saved in a second component of the client's update cache. In this description of the synchronization sub-routine 1050, if an update is installed it can be assumed that the prerequisites and the conditions of the applicability rules have been met. Installation of an update for purposes of describing this sub-routine does not necessarily mean that the data files associated with the update are actually installed in the client computing device 110.

In one embodiment, the two components of the client's update cache can be used to categorize the received updates. The first component is used for storing installed, non-LEAF updates; and a second component is used for storing all other updates received by the client, i.e., the updates that were not installed. The second component of the update cache also includes the storage of all LEAF updates. As described in more detail below, updates stored in the update cache can be communicated to and processed by the metadata server 123 to identify other related updates that are available for installation on the client computing device 110.

Returning now to FIG. 10, details of the synchronization request, which are illustrated as items 1051, 1055, and 1060, will now be described. As will be appreciated by those of ordinary skill in the art, the synchronization request may be initiated by one of a number of different devices, processes, applications, user-initiated commands, requesting an update. The synchronization request may be initiated by a user requesting a list of updates, an automatic update initiated by the client agent, or any other software component requesting information from the metadata server 123 or the update service 120. In one embodiment, the synchronization request includes an authorization server cookie, such as the authorization server cookie generated from the authorization routine 702. The use of the server cookie allows the server to determine if the client is a member of one or more target groups.

Each synchronization request may also include identifiers for each update stored in the client's update cache. More specifically, if one or more updates are stored in the update cache, the synchronization request includes a first component having identifiers for installed, non-LEAF updates; and a second component having identifiers for all other updates, such as LEAF updates, failed updates, and other updates that are not installed. The update identifiers may be in any format including, but not limited to, an array of integers. Alternatively, if there are no updates stored in the client's update cache, the synchronization request is not configured with an update identifier. When a synchronization request is not configured with an update identifier, the synchronization request provides an indication that the client computing device 110 does not have any cached updates.

As shown in FIG. 10, a first synchronization request 1051 is communicated from the client computing device 110 to the metadata server 123. In the present example, the client's update cache will not contain any updates, given that this is the first execution of the method. Thus, the first synchronization request 1051 does not contain an identifier for a cached update. In response to receiving a synchronization request, as shown in block 1052, the metadata server 123 determines if the synchronization request contains at least one update identifier. If it is determined that the synchronization request does not include an update identifier, the metadata server 123 responds by selecting first level updates for communication to the client computing device 110. As described above, first level updates may include any updates that do not have a prerequisite identifying other updates.

Alternatively, if it is determined that a synchronization request contains at least one update identifier, the metadata server 123 examines the prerequisites of the server's stored updates to select additional updates for delivery to the client. In one embodiment, the metadata server 123 selects updates having fulfilled prerequisites. In the examination of the prerequisites, the server uses the updates of the first component of the synchronization request, which includes identifiers of the non-LEAF updates that are installed on the client.

In addition to selecting updates having fulfilled prerequisites, the server also uses the updates identified in the second component of the synchronization request to filter the selected updates. More specifically, uninstalled updates, LEAF updates and failed updates identified in the second component of the synchronization request are used to filter one or more selected updates. This feature of the present invention allows the system and method of the present invention to avoid multiple transmissions of updates stored on the metadata server 123.

Returning to the present example, since the first synchronization request 1051 does not include an update identifier, the metadata server 123 selects the base level of updates 901 for communication to the client computing device 110. With reference to the sample set of updates shown in FIG. 9, the base level of updates 901 includes the updates referenced as 911, 912, 913, 914, and 915.

In the processing of block 1052, the metadata server 123 also examines the authorization server cookie contained in the synchronization request 1051 to identify the target groups that are associated with the client computing device 110. The metadata server 123 also examines the target groups of the updates selected in the process of block 1052. The process of block 1052 then filters out all selected updates that are not associated with a target group identified in the received authorization server cookie. In the present example, since all of the selected updates 911, 912, 913, 914, and 915 are associated with the PID and All Computer target groups, all of the selected updates are sent to the client computing device 110.

The metadata server 123 then communicates the selected updates in a synchronization response 1053 to the client computing device 110. In general, each synchronization response includes the instruction component of each update sent by the server 120. Thus, in the present example, the first synchronization response 1053 includes the instruction components for the updates referenced as 911, 912, 913, 914, and 915. In one embodiment, each synchronization response does not include the localized data component or the data component of each update.

Next, as shown in block 1054, the client computing device 110 processes the instruction components of each received update to determine if the condition defined in the applicability rules can be met. With reference again to FIG. 9, the client computing device 110 processes the instruction components of the received updates 911-915. For purposes of illustrating the present invention, it is given in this example that the operating system of the client computing device 110 is an English installation of Windows® version XP SP1. It is also given that the client computing device 110 is a Dell PC and is running a 32-bit, X86 processor. Thus, in the processing of the instruction components of the sample set of updates, the client computing device 110 would determine that the condition defined in the first update 911 would be met because the computer contains an English OS. The condition defined in the second update 912 would be met because the operating system is Windows® version XP SP1. The condition defined in the third update 913 would be met because the client computing device 110 is running an X86 processor. The condition defined in the fifth update 915 would be met because the client computing device 110 is a Dell PC. As a result, the first update 911, second update 912, third update 913, and fifth update 915 are all saved in the first component of the client's update cache. The condition defined in the fourth update 914 would not be met because the client computing device 110 is not running a 64-bit X86 processor. Thus, the fourth update 914 is considered to be a failed update and saved in the second component of the client's update cache.

Returning to FIG. 10, in the processing of block 1054, the client computing device 110 also determines if a subsequent synchronization request is required. In one embodiment, it is determined that a subsequent synchronization request is required if at least one of the received updates indicates that it is not a LEAF update. In the present example, it is determined that a subsequent synchronization request is required because all of the received updates are not LEAF updates. Thus, the client computing device 110 communicates a subsequent synchronization request 1055 to the metadata server 123.

As summarized above, a synchronization request includes identifiers for each update stored in the client's update cache. Thus, in the present example, the subsequent synchronization request 855 includes a first data component indicating that the first update 711, second update 712, third update 713, and fifth update 715 are installed on the client. In addition, the subsequent synchronization request 855 includes a second data component indicating that the fourth update 711 is not successfully installed on the client.

In response to receiving the subsequent synchronization request 1055, as summarized above, the metadata server 123 determines if the subsequent synchronization request 1055 contains at least one update identifier. If it is determined that subsequent synchronization request contains at least one update identifier, the metadata server 123 examines the prerequisites of all stored updates to select additional updates for delivery to the client.

With reference again to the present example, in the processing of block 856, the metadata server 123 would select the sixth update 921 because its prerequisites are met. More specifically, as shown in FIG. 9, the sixth update 921 is selected for communication to the client computing device 110 because its prerequisite, which requires installation of the first update 711, second update 912, and third update 913, is fulfilled. The seventh update 922 and eighth update 931 would not be selected for communication to the client because their prerequisites are not fulfilled. More specifically, the synchronization request 1055 did not contain an identifier for the fourth update 914, which is a prerequisite for the seventh update 922. In addition, the synchronization request 855 did not contain an identifier for the sixth update 921, which is a prerequisite for the eighth update 931.

Returning to FIG. 10, the synchronization sub-routine 1050 continues by communicating the selected updates in a subsequent response 1057 from the metadata server 123 to the client computing device 110. With reference again to the present example, the subsequent response 1057 would include information related to the sixth update 721, is communicated to the client 110 in a subsequent response 1057.

Upon receiving the subsequent response 1057, the client computing device 110 processes the instruction components of the subsequent response 857. Similar to the process of block 854, the client computing device 110 processes the instruction components of each received update to determine if the condition defined in the applicability rules is met. In the present example, if it is given that the XP PATCH1 is installed in the client computing device, the sixth update 921 is considered to be installed and the update is written to the update cache of the client computing device 110. Since the sixth update 921 is not a LEAF update, the client computing device 110 sends another synchronization request 1060 that includes all of the updates stored in the first and second component of the client's update cache. The synchronization request 1060 also includes the authorization server cookie.

In the present example, by use of the above-described processing of the metadata server 123, the synchronization request 1060 is processed at block 1061 where the server selects the eighth 731 update. The eighth 931 update is selected because the synchronization request 1060 indicates that the fifth and the sixth updates 915 and 921 are installed in the client computing device 110. Given that the eighth update 931 is associated with the same target groups identified in the authorization server cookie, the instruction component of the eighth update 931 is communicated to the client computing device 110 in another response 1062. The eighth update 931 is then processed in block 1063 in a manner similar to the process of blocks 1054 and 1059. Since all of the received updates of the response 1062 are LEAF updates, a subsequent synchronization request is not sent back to the metadata server 123.

At the client computing device 110, after it is determined that all of the received updates are LEAF updates, or if no updates are received in the response 1062, the synchronization sub-routine 1050 communicates a driver synchronization request 1064 from the client computing device 110 to the metadata server 123. As will be appreciated by one of ordinary skill in the art, the driver synchronization request 1064 may include information describing all of the hardware installed in the client computing device 110 and information describing the installed software. Similar to the prior software synchronization requests (1051, 1055 and 1060), the driver synchronization request 1064 may communicate the installed updates to the server. In addition, all of the driver updates currently cached on the client, if any, are communicated to the server.

In response to receiving the driver synchronization request 1064, the metadata server 123 responds by sending all of the driver updates that apply to the client computing device 110 that are not already cached on the client. A driver update is sent to the client computing device 110 in a response 1065 if its prerequisites and conditions are met. The response 1065 communicating the driver updates preferably communicates the instruction component of each update. The driver updates are then written to the update cache of the client computing device.

After the receiving the response 1065 containing the driver updates, the synchronization sub-routine 1050 sends a request 1066 for the localized data of each of the received software and hardware updates. As summarized above, the localized data component of each update includes general information describing the update. For instance, the localized data component may include information describing the features and benefits of the update. The localized data component may also include a text description of the installation procedures of the update. In addition, the localized data component may include any other data or information related to the update.

Thus, upon receiving request 1066 for the localized data of each of the received software updates and hardware updates, the metadata server 123 responds by sending all of the localized data for all of the received software updates and hardware updates saved in the update cache of the client. Once received, the localized data can be processed by a software application to determine which of the updates needs to be installed. Alternatively, the received localized data can be displayed to a user to inform the user of all updates that are available to the client computing device 110. In one embodiment, the received localized data can be displayed on a Web page. In the present example, localized data may be received by the client for the sixth and eighth updates 921 and 931. If localized data is stored in the base updates 911, 912, 913 and 915, the localized data for those update would also be received by the client.

Figure 11:
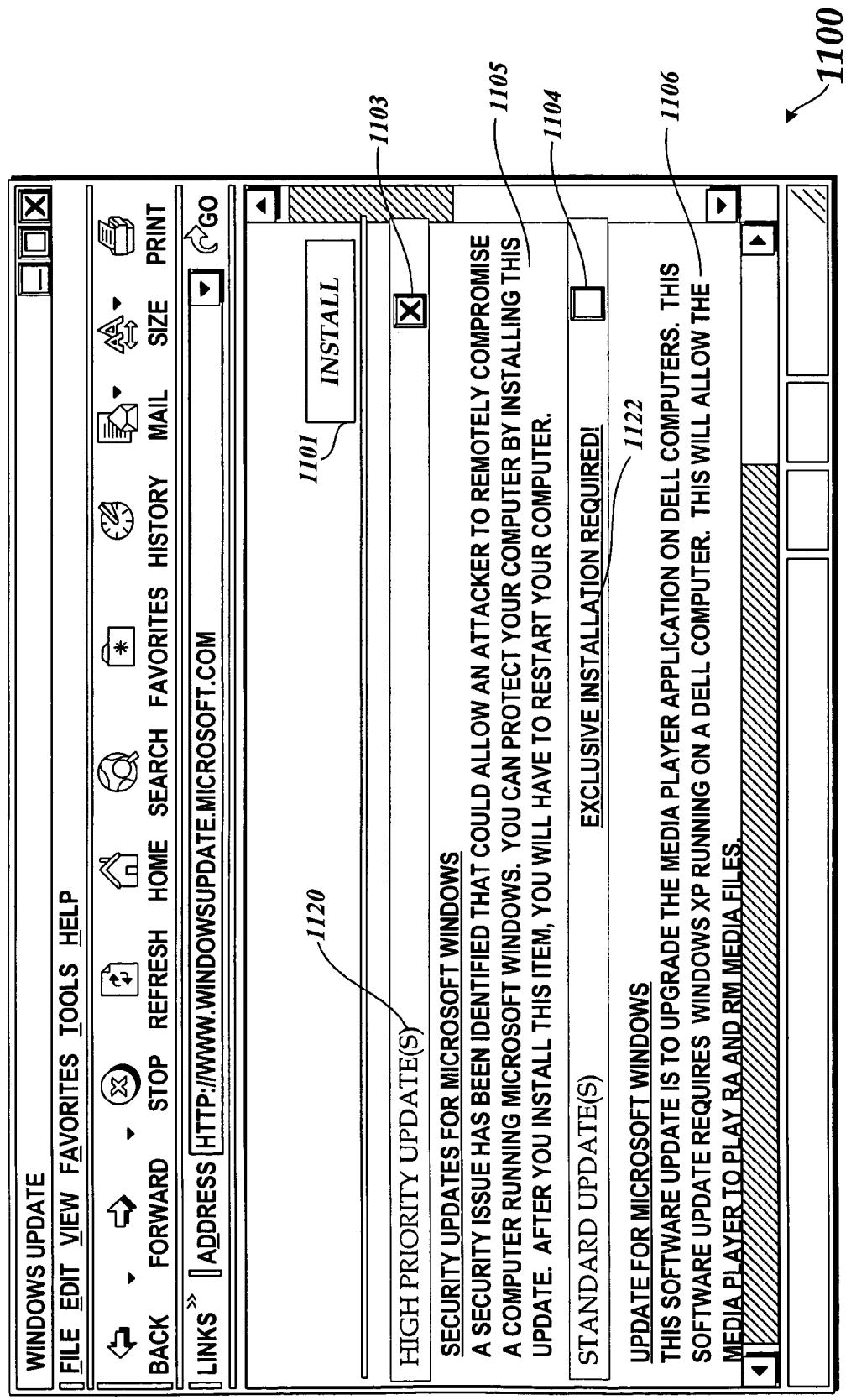
FIG. 11 is a block diagram illustrating an exemplary section of a graphical user interface for displaying a list of software updates that are available to an individual client computing device, in accordance with the present invention.

FIG. 11 illustrates one example of a Web page 1100 displaying an example of localized data associated with the updates that are available to the client. For illustrative purposes, the Web page 1100 comprises a first detailed description 1105 of an update and a second detailed description 1106 of another update. Also shown, each update is respectively associated with selection mechanisms 1103 and 1104 for receiving a user selection of the updates. Also shown, the Web page 1100 is configured with a control button 1101 for allowing a user to control the communication of the selection of updates to a server, such as the metadata server 123 or download server 124.

In one aspect of the present invention, the client performs a number of processes to enhance the display of the Web page 1100. For instance, the client computing device 110 examines the localized data of each update to determine if a particular update is of high priority. Such a feature can be facilitated by locating text in the localized data, or in other component of a particular update, that indicates that the particular update is a high priority or emergency update. If the client computing device 110 detects a high priority update or emergency update, the client displays the high priority update in a visible section of the Web page 1100, such as the top section of the page. In addition, the client may generate a visual indicator, such as a specialized text message 1120, indicating that the update is a high priority update.

The client computing device 110 may also examine the localized data of each update to determine if a particular update requires an exclusive installation, i.e., an update having an installation file that cannot be simultaneously installed with an installation file of another update. Such a feature can be facilitated by locating text in the localized data, or in other component of a particular update, that indicates that the particular update requires an exclusive installation. If the client computing device 110 detects such an update, the client displays a visual indicator, such as the text message 1122 shown in FIG. 11, with the description of the updates that require an exclusive installation.

Returning to FIG. 7, the software update routine 700 continues at block 708 where the client computing device 110 receives a selection of the updates. As noted above, in response to actuation of the control button 1101, the selection of the one or more updates can be obtained by the metadata server 123 or the download server 124. Once the selection of one or more updates is received the software update routine 700 continues at block 708 where the selected software updates are processed.

Figure 12A:
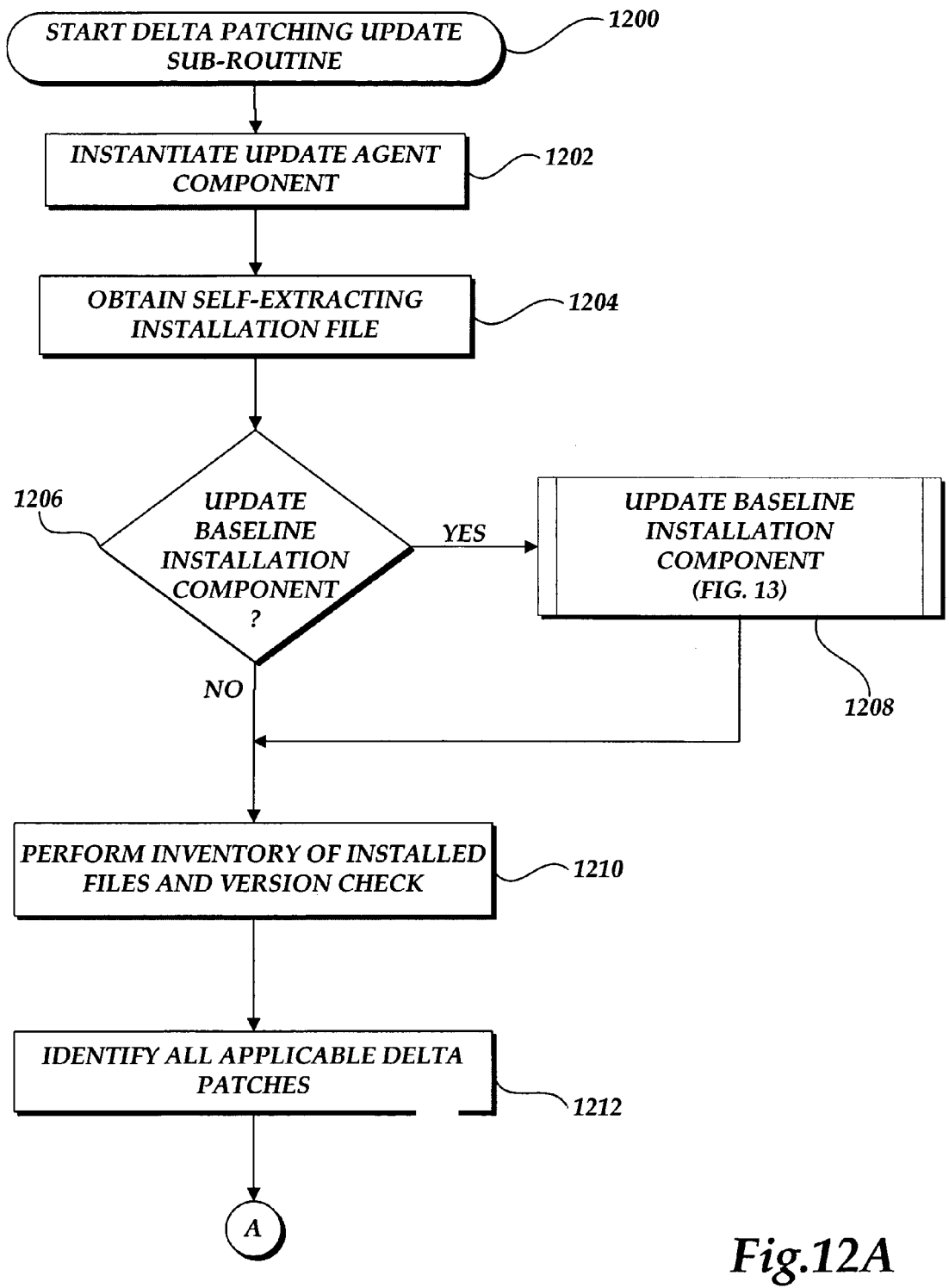
FIGS. 12A and 12B are illustrative of a software update processing sub-routine 1200 implemented by the client computing device 110 to retrieve and install requested software in accordance with the present invention.
Figure 12B:
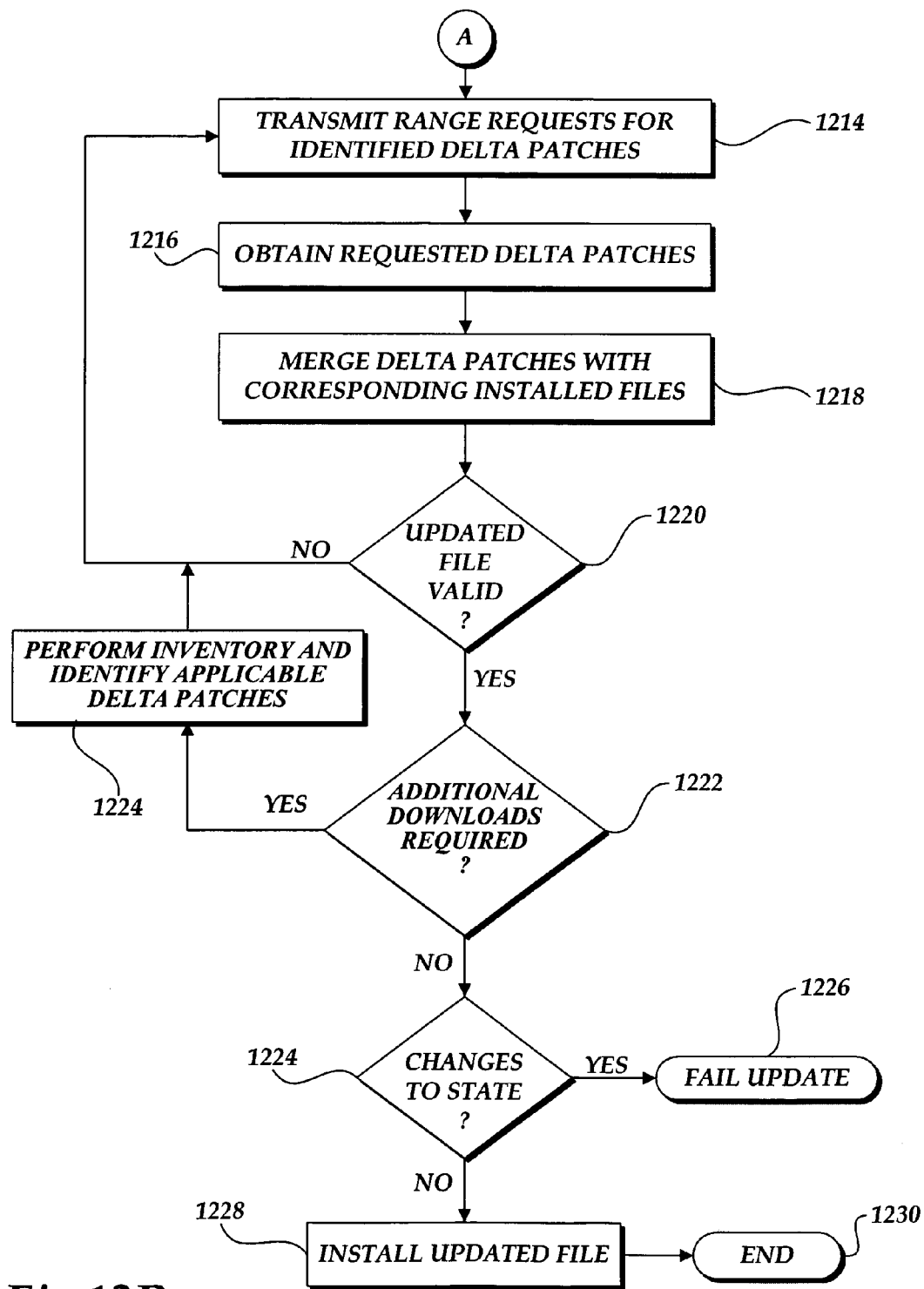

In accordance with still another aspect of the present invention, the software update service 120 may provide a method for selecting and transmitting information between the software update service and the client computing device 110. FIGS. 12A and 12B are illustrative of a software update processing sub-routine 1200 implemented by the client computing device 110 to retrieve and install requested software in accordance with the present invention. As described above, the software update processing sub-routine 1200 may be implemented once a selection of software updates has been generated or received. With reference to FIG. 12A, at block 1202, the update management component 111 instantiates an update agent 118. In an illustrative embodiment of the present invention, the update agent 118 is a specialized software component for determining what software update information is required to completed a requested software update, to generate a required version of an installation component of the update agent, to generate updated files by merging existing files with delta patches, and/or to initiate the installation of updated files. In the event that an update agent 118 is already instantiated, block 1202 may be omitted.

At block 1204, the update agent 118 obtains software update information from the update service 120. In an illustrative embodiment of the present invention, the software update information transmitted by the update service 120 is in the form of a package, such as a self-extracting file, that includes a variety of data that may be utilized by the update agent. In one aspect, the package can include a list of all the files that correspond to a particular software update. Additionally, the package can include copy of at least a portion of the patch storage manifest that maps specific versions of files to be updated to a corresponding software update delta patch stored in the patch storage file on the update service 120. The package can also include installation information for each file to be updated that can include an identification of a version of an installation component required to complete the installation. Further, the package can also include an installation component for the update agent 118 or a delta patch to update a version of an installation component already stored on the client computing device 110. Still further, the package can include verification information to allow the update agent to determine whether a software update was successful. For example, the verification information can include reference hash values for updated files for comparison. The update agent 118 may also verify the contents of package.

At decision block 1206, a test is conducted to determine whether the update agent 118 needs to update a version of the installation component to implement the update. One skilled in the relevant art will appreciate that the transmission of a complete copy of an installation component in the self-extracting file can increase the amount of data transmitted by the update service 120 for each software update. Accordingly, in an illustrative embodiment of the present invention, a baseline version of an installation component may be stored in the client computing device and updated specifically for the requirements of the current software update by way of an installation component delta patch. Accordingly, the installation information in the self-extracting file instructs the update agent 118 whether or not any included installation component updates need to be merged with the baseline version of the installation component on the client computing device 110. If an update is required, at block 1208, the update agent 118 updates the baseline installation component, as will be explained in greater detail below with regard to FIG. 13.

Once the update agent updates the installation component or if the installation component does not require an update, at block 1210, the update agent 118 performs an inventory of files installed on the client computing device 110 and the specific version of the file. In an illustrative embodiment of the present invention, the update agent 118 may query the client computing device 110 file system for all files identified in the package as corresponding to the selected update. Alternatively, if the update agent 118 has recently conducted an inventory, a cached version of the inventory may be utilized. At block 1212, the update agent 118 identifies what software update information is required to complete the requested update. In an illustrative embodiment of the present invention, the patch storage manifest includes a mapping of versions of an installed file to a required delta patch. Accordingly, if delta patching is available, the update agent 118 will utilize the mapping to identify a particular delta patch and its offset location within the patch storage file. Alternatively, if delta patch is not available or cannot implemented, the update agent 118 may identify an entire file for download.

With reference now to FIG. 12B, at block 1214, the update date agent transmits a request for the identified software update information. In an illustrative embodiment of the present invention, the update agent 118 can transmit a request for specific delta patches by indicating a specific range of patches required from the patch storage file to the download server 124 of the update service 120. As described above, the patch storage file includes a large of number of applicable delta patches, in which each delta patch is identified by its location with the patch storage file. Because the patch storage file may be rather large in some implementations, the update agent 118 can utilize a request that only requests for data from specific locations in the patch storage file as indicated from the patch storage manifest. In an alternate embodiment of the present invention, the update agent 118 may request an entire copy of an update file and/or a complete copy of the patch storage file.

In an alternate embodiment of the present invention, another download server that may not be exclusively associated with the update service 120 can process the update agent 118 request. In this embodiment, the request patch storage file may be transmitted, in whole or in part, to any number of additional download servers on a network. The additional download servers may be part of a private network utilized to update clients on the private network. Further, the additional download server may be part of public network. In a private network environment, the download servers may obtain a complete copy of the patch storage file for processing client requests. Alternatively, the download servers may also cache portions of the patch storage file in processing previous data requests from other clients and utilize the cache data to satisfy the download. Accordingly, the additional download servers can reduce the communications strain on the download server 124 of the update service 120.

At block 1216, the update agent 118 receives the requested update information. In an illustrative embodiment of the present invention, the requested update information may be transmitted in two approaches. In a first approach, referred to as manual update, the update request is sent to the update service 120 with a request for a direct HTTP data delivery response. In this approach, the update service 120 may utilize all of the entire bandwidth available to transmit the requested data to the update agent 118. In a second approach, referred to as an automatic update, the update request is sent to the update service 120 with a request for an indirect HTTP data delivery response. In this response, the update service 120 transmits the requested data as a background process. The background process may be implemented in a manner to utilize a minimal amount of available bandwidth. Further, the background process may be interrupted during the download process and restarted at the next available time. A description of a system and method for transmitting requested data via a background process is described in commonly assigned and copending U.S. patent application Ser. No. 09/505,735, entitled System and Method for Transferring Data Over a Network, and filed on Feb. 16, 2000, which is hereby incorporated by reference. One skilled in the relevant art will appreciate that foreground or background data delivery is not necessarily reflective of a priority of the selected software update, but rather how bandwidth is allocated to obtain the update information.

Once the requested in formation is received from the update service, at block 1218, the update agent 118 merges the delta patch with the corresponding installed files. In an illustrative embodiment of the present invention, the update agent 118 may cache the original version of the installed file to ensure that the selected file does not change during the download and merging process. Further, the cached original version of the installed file may be used to uninstall the selected update.

At decision block 1220, a test is conducted to determine whether the updated file is valid. In an illustrative embodiment of the present invention, the update agent 118 may utilize a hashing algorithm to compare a reference hash value obtained from the update information package and corresponding to a valid file update with a hash from the current modified file. If the hashes do not match, the current modified file is not valid. One skilled in the relevant art will appreciate that any one of a number of alternative validation algorithms may also be utilized. If the updated file is not valid, the sub-routine 1200 returns to block 1214, where the update agent may request the update information again. Alternatively, if the update agent 118 has unsuccessfully attempted to generate the update file several times, the update agent may implement one of several fallback procedures. In one embodiment of the present invention, the update agent 118 may request a completed copy of the updated file stored in the patch storage file and identified from the patch storage manifest from the update service 120. In another embodiment of the present invention, the update agent 118 may request a copy of the updated file in a self-contained file from the update service 120. In still another embodiment of the present invention, the sub-routine 1200 may otherwise fail.

Once the selected file is valid, at decision block 1222, a test is conducted to determine whether any additional downloads are required. In an illustrative embodiment of the present invention, the sub-routine 1200 enters into an iterative loop that continuously checks for additional downloads after the completion of a previously selected download. If the state of a file changes during the download, the update agent 118 would continue to request additional downloads for the new change of state. If additional downloads are required, at block 1224, the update agent 118 performs another inventory and identifies all applicable delta patches. The sub-routine 1200 then returns to block 1214.

Once all the requested update downloads are complete, at decision block 1226, a test is conducted to determine whether the state of the client machine has changed. In an illustrative embodiment of the present invention, time may elapse between the downloading and merging of update information and the actual installation of the updated file. Accordingly, prior to installing the updated file, the update agent determines whether the client computing device state has changed. If the state has changed, the file update may not be valid and the update fails at block 1228. Alternatively, if no state change has occurred, the update agent 118 installs the updated file at block 1230 and the sub-routine 1200 returns at block 1232.

Figure 13:
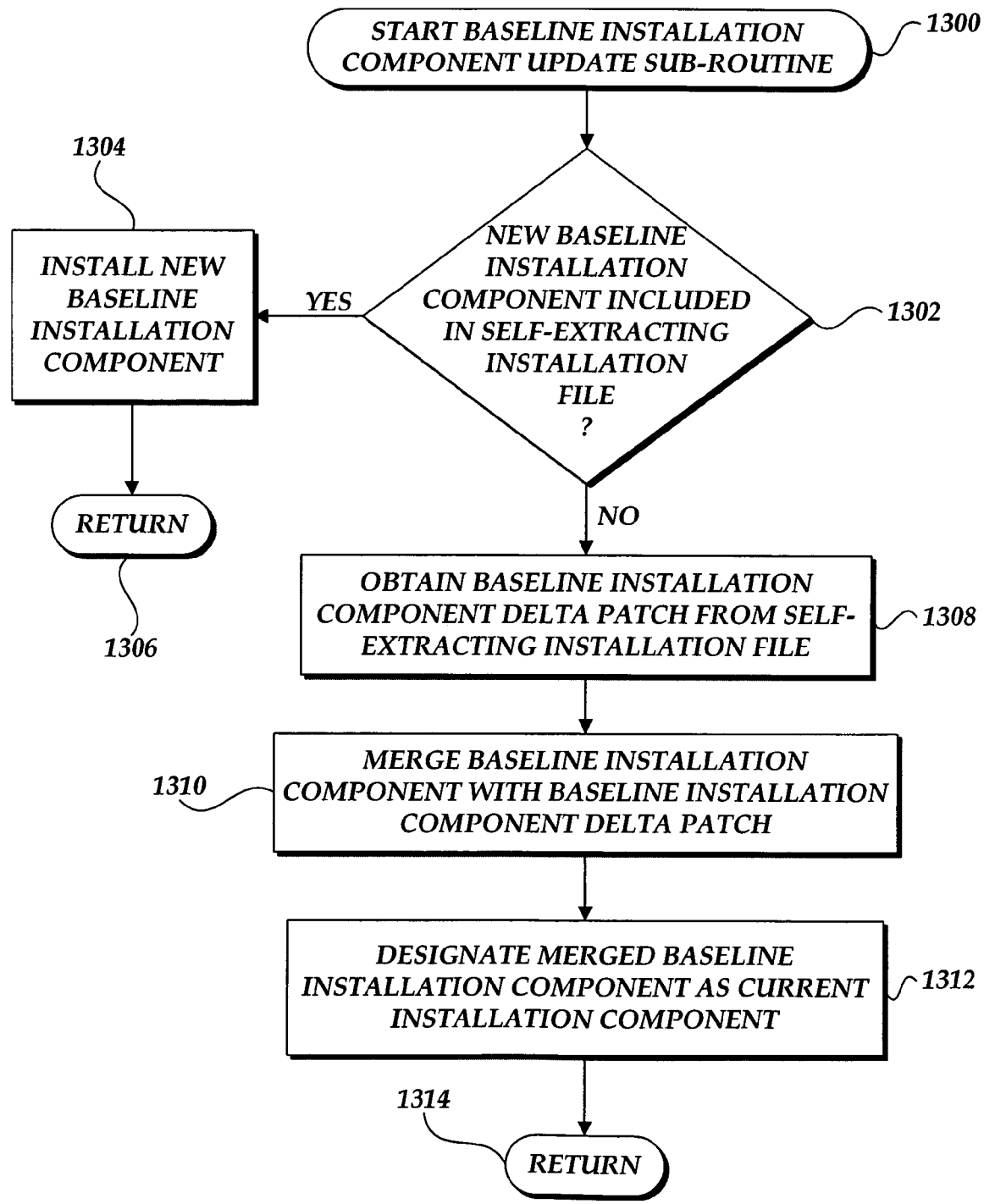
FIG. 13 is a flow diagram illustrative of a sub-routine implemented by a client computing device for updating a baseline installation component in accordance with the present invention.

With reference now to FIG. 13, a sub-routine 1300 implemented by the client computing device 110 for updating a baseline installation component corresponding to block 1208 (FIG. 12A) will be described. At decision block 1302, a test is conducted to determine whether a new baseline installation component is included in the self-extracting file transmitted to the update agent 118 from the update service 120. In an illustrative embodiment of the present invention, if the delta patches required to update the baseline installer are comparable in size to the transmission of an updated installation component, a new baseline installation component will be transmitted. If an updated installation component is included, at block 1304, the update agent installs the updated baseline installation component as the new installation component. Additionally, the new updated installation component may be saved in the client computing device 110 memory to serve as a baseline installer for additional updates. At block 1306, the sub-routine returns.

If an updated baseline installation component is not included in the self-extracting file, at block 1308, the update agent 118 obtains a baseline installation component delta patch from the self-extracting file. In an illustrative embodiment of the present invention, the baseline installation component delta patch corresponds to software code that can be merged with the baseline installation component to generate an updated baseline installation component. Accordingly, at block 1310, the updated agent merges the baseline installation component delta patch with the baseline installation component. At block 1312, the update agent 118 then designates the updated baseline installation component as the current installation component. In an illustrative embodiment of the present invention, the updated installation component will not be saved after the installation is complete. In accordance with this embodiment, the update agent 118 only maintains a limited number of baseline installation components in the client computing device 110 memory. Accordingly, the update agent generates a temporary, updated installation component at each installation. Because each client computing device 110 can only correspond to a limited number of baseline installation components, the update service 120 is only required to transmit a single baseline installation component delta patch for each client computing device. At block 1314, the sub-routine 1300 returns.

While the preferred embodiment of the invention has been illustrated and described, it will be appreciated that various changes can be made therein without departing from the spirit and scope of the invention. For instance, although the illustrative examples described herein apply to software updates, the scope of the present invention includes other uses beyond the distribution and communication of information related to software updates. Accordingly, unless specific subject matter is expressly excluded in this disclosure, it is to be appreciated that the scope of the present invention applies to distribution and communication of any type of data, other than, or in addition to software updates.

The embodiments of the invention in which an exclusive property or privilege is claimed are defined as follows:

1. A method for managing the updating of files on a client computing device, the method comprising:
   (a) synchronizing available updates with an update service, including traversing a software update hierarchy to identify specific software updates that apply to the client computing device, the software update hierarchy including at least a base set of one or more base updates and a second set of one or more second tier updates, wherein
      (i) each base update includes one or more applicability conditions to be tested at the client computing device to determine if the base update is applicable to the client computing device; and
      (ii) each second tier update includes: (a) one or more applicability conditions to be tested at the client computing device to determine if the second tier update is applicable to the client computing device, (b) prerequisites identifying one or more base updates that are required for proper installation of the second tier update, and (c) an indicator of whether or not the second tier update is a leaf update;
   (b) receiving a selection of one or more software updates from among the identified specific software updates that apply to the client computing device;
   (c) obtaining a self extracting file including the selected software updates and installation information identifying a baseline installation component stored on the client computing device, the baseline installation component required to install the software updates on the client computing device;
   (d) selecting the required baseline installation component stored on the client computing device;
   (e) determining whether the required baseline installation component stored on the client computing device is needed to be updated;
   (f) determining if the self-extracting file contains a new baseline installation component and an installation component delta patch to update the required baseline installation component stored on the client computing device;
   (g) if the new baseline installation component is not included in the self-extracting file, obtaining the installation component delta patch to update the required baseline installation component stored on the client computing device, merging the installation component delta patch with the required baseline installation component to create a merged installation component; and
   (h) installing the selected software updates on the client computing device utilizing the merged baseline installation component by:
      (i) conducting an inventory of files installed on the client computer;
      (ii) identifying all applicable delta patches required to update the installed files;
      (iii) obtaining the identified delta patches; and
      (iv) merging the identified delta patches with the corresponding installed files.

2. The method as recited in claim 1, wherein the selected software updates include one or more files to be installed on the client computing device.

3. The method as recited in claim 1, wherein the installation information identifying the baseline installation component includes information identifying a particular version of the baseline installation component stored on the client computing device.

4. The method as recited in claim 1 further comprising deleting the merged installation component upon installing the selected software updates on the client computing device.

5. The method as recited in claim 1 further comprising:
if the self-extracting file includes the new baseline installation component, obtaining the new baseline installation component; and installing the new baseline installation component on the client computing device.

6. The method as recited in claim 1, wherein the baseline installation component is selected from a set of baseline installation components, the set of baseline installation components being organized according to a version of the baseline installation components and wherein the selecting the baseline installation component includes information selecting a particular version of a baseline installation component from the set of baseline installation components.

7. The method as recited in claim 1, further comprising using an extensible targeting mechanism to control the client computing device's access to the available software updates prior to synchronizing available updates, including the extensible targeting mechanism determining that the client computing device is included in at least one target group associated with each of the available updates.

8. A computer program product embodied on a computer for use at a client computer device, the computer program product for implementing a method for managing the updating of files on the client computing device, the computer program product containing computer-executable instructions that, when executed at a processor, cause the client computing device to perform the method including the following:
   (a) synchronizing available updates with an update service, including traversing a software update hierarchy to identify specific software updates that apply to the client computing device, the software update hierarchy including at least a base set of one or more base updates and a second set of one or more second tier updates, wherein
      (i) each base update includes one or more applicability conditions to be tested at the client computing device to determine if the base update is applicable to the client computing device; and
      (ii) each second tier update includes: (a) one or more applicability conditions to be tested at the client computing device to determine if the second tier update is applicable to the client computing device, (b) prerequisites identifying one or more base updates that are required for proper installation of the second tier update, and (c) an indicator of whether or not the second tier update is a leaf update;
   (b) receiving a selection of one or more software updates from among the identified specific software updates that apply to the client computing device;
   (c) obtaining a self-extracting file including the selected software updates and installation information identifying a baseline installation component stored on the client computing device, the baseline installation component required to install the software updates on the client computing device;
   (d) selecting the required baseline installation component stored on the client computing device;
   (e) determining whether the required baseline installation component stored on the client computing device is needed to be updated;
   (f) determining if the self-extracting file contains a new baseline installation component and an installation component delta patch to update the required baseline installation component stored on the client computing device;
   (g) if the new baseline installation component is not included in the self-extracting file, obtaining the installation component delta patch to update the required baseline installation component stored on the client computing device;
   (h) merging the installation component delta patch with the required baseline installation component to create a merged installation component; and
   (i) installing the selected software updates on the client computing device utilizing the merged installation component by:
      (i) conducting an inventory of files installed on the client computer;
      (ii) identifying all applicable delta patches required to update the installed files;
      (iii) obtaining the identified delta patches; and
      (iv) merging the identified delta patches with the corresponding installed files.

* * * * *